United States Patent [19]
Brown

[11] Patent Number: 5,771,278
[45] Date of Patent: *Jun. 23, 1998

[54] METHOD AND APPARATUS FOR MINIMIZING SYSTEM OSCILLATIONS CAUSED BY ACOUSTICAL COUPLING

[75] Inventor: Paul M. Brown, Pleasanton, Calif.

[73] Assignee: Cirrus Logic, Inc., Fremont, Calif.

[ * ] Notice: The term of this patent shall not extend beyond the expiration date of Pat. No. 5,524,047.

[21] Appl. No.: 561,903

[22] Filed: Nov. 22, 1995

Related U.S. Application Data

[63] Continuation-in-part of Ser. No. 173,761, Dec. 27, 1993.
[51] Int. Cl.[6] .................................................. H04M 11/00
[52] U.S. Cl. .................................... 379/93.05; 379/93.26; 375/222; 375/391
[58] Field of Search ...................... 379/90, 93, 388–392, 379/420, 90.01, 93.01, 93.05, 93.26–93.37; 375/222; 381/71, 93, 95–97

[56] References Cited

U.S. PATENT DOCUMENTS 3,922,488  11/1975  Gabr ......................................... 379/390
4,506,114  3/1985  Burgin ..................................... 379/392
5,537,436  7/1996  Bottoms et al. ......................... 375/222

Primary Examiner—Paul Loomis
Assistant Examiner—Stephen W. Palan
Attorney, Agent, or Firm—Frank D. Nguyen

[57] ABSTRACT

An apparatus and method for canceling system oscillations caused by acoustical coupling is provided. The invention can be implemented in a low voltage environment and as an integrated circuit. Audio voltage signals generated by a microphone are provided as input to a data/fax/voice modem. The data/fax/voice modem processes the audio voltage signals and outputs differential transmit voltage signals to a hybrid/daa circuit for converting to a two-wire (tip and ring) circuit before connecting to a communication device such as a land based telephone or a cellular radio. Audio voltage signals generated by the communication device are provided via a two-wire (tip and ring) circuit to the hybrid/daa circuit for converting into a four-wire circuit and then provided as input to the data/fax/voice modem as differential receive voltage signals. The differential transmit voltage signals are amplified and phase shifted so that they are out of phase relative to the differential receive voltage signals which are also amplified. The differential transmit voltage signals and the differential receive voltage signals are then added together. The combined signals are then output to an audio speaker.

21 Claims, 15 Drawing Sheets

METHOD AND APPARATUS FOR MINIMIZING SYSTEM OSCILLATIONS CAUSED BY ACOUSTICAL COUPLING

RELATED APPLICATION

This application is a Continuation-in-part of U.S. patent application Ser. No. 08/173,761, filed Dec. 27, 1993, for "METHOD AND APPARATUS FOR EMULATING TELEPHONIC COMMUNICATIONS WITH A MODEM AND HEADSET".

FIELD OF THE INVENTION

The invention generally relates to modems and communication devices, and more particularly relates to a device for minimizing system oscillations due to acoustical coupling. The communication device may be a telephone, cellular radio or any other communication device using visible light, infrared, ultraviolet, radio or acoustic waves.

BACKGROUND OF THE INVENTION

Modems are commonly employed for allowing a host computer to input and output data to other devices through a telephone line connected to the public switched telephone network (PSTN). Traditionally, modems allowed for only data communication in the form of encoded data or facsimile data. To allow for ordinary, voice telephone calls, a separate telephone is needed for direct connection into the PSTN.

More recently modems have been developed which incorporate voice telephonic features. One such device is a data/fax/voice modem. The data/fax/voice modem automatically answers an incoming telephone call received along a telephone line connected to the PSTN. The data/fax/voice modem then determines whether the received telephone call includes a data message, a facsimile message, or an ordinary voice message. If the incoming message is a data message, a data modem module of the data/fax/voice modem operates to receive and decode the data message for storage in a computer memory or other storages of a host computer such as a hard disk drive. If the incoming message is a facsimile message, a fax module of the data/fax/voice modem operates to receive and decode the facsimile image for storage within the memory of the host computer. Alternatively, a facsimile print-out device may be connected to the data/fax/voice modem for automatically printing the facsimile image, thus eliminating the need to store the facsimile image within the host computer. If the incoming message is a voice message, an answering machine module of the data/fax/voice modem operates to answer the incoming voice communication. Initially, the answering machine module of the data/fax/voice modem outputs a prerecorded greeting, then records a voice message in response to the greeting. An analog-to-digital converter means is typically included within the data/fax/voice modem for converting the incoming voice message to digital signals for storing in the memory of the host computer. Alternatively, the data/fax/voice modem may be connected to a conventional analog recording device, such as a tape recorder for recording the voice message. As can be appreciated, a variety of implementations and configurations are available.

To allow an operator to listen to received voice messages and to record the answering machine greeting, a telephone headset is typically provided. The telephone headset, which includes an earphone and a microphone, is connected directly into the modem. However, no capability is provided for receiving or placing a voice telephone call using just the headset, modem and host computer. To be able to place telephone calls or to converse directly with a calling party, a separate telephone is required for connection to the PSTN line.

FIG. 1 illustrates a set-up wherein a telephone is provided in combination with a modem. More specifically, FIG. 1 illustrates a set-up having a modem 10, a host computer 12, a telephone headset 14, and a separate telephone 16. As can be seen, telephone 16 is directly connected to a telephone line 18 interconnecting the PSTN and modem 10. In some systems, telephone 16 is directly connected into modem 10. However, even in such systems, internal circuitry bypasses the modem operations to provide only a direct interconnection between telephone 16 and telephone line 18.

Although the setup of FIG. 1 provides for both placing and receiving voice telephone messages, the setup is not ideal. For example, undesirable redundancy results from a need to provide both a complete telephone 16 and a separate telephonic headset 14. In particular, two sets of speaker and microphone mechanisms are required, one on the headset and one on the telephone. Moreover, much of the functionality of the telephone, including call initiation, dialing, repertory dialing and call answering, are duplicated within the modem and the telephone. Another disadvantage is that a large bulky telephone is required to conduct ordinary voice communications. Carrying such a large telephone may not be practical, especially for portable applications. Moreover, the physical size of a standard module telephone jack is difficult to incorporate into small form-factor modems and other devices. To avoid these and other disadvantages, it would be desirable to provide a mechanism which would allow modem 10, host computer 12 and headset 14 to emulate the telephone, thereby eliminating the need to provide a separate telephone.

Similar disadvantages occur with other communications devices, besides modems, such as facsimile machines and personal digital assistant systems (PDA's).

Non-land-line based communication media have been employed for transmitting telephonic communications. Examples include cellular radio and related devices. Other examples include non-hard-wired local area networks (LAN's) which may employ radio or infrared signaling. The above-described disadvantages in conventional modems can occur in non-land-line based devices and are not limited solely to land based telephone lines or to the PSTN telephone network.

A natural extension of telephonic communication which has gained wide usage in recent years is the speakerphone. Using the speakerphone, a user can communicate without the cumbersome handset. Additionally, using the speakerphone, more than one user may join in a conversation at any given time. Consequently, the speakerphone offers great conveniences for users who require the use of a telephone while engaging in other tasks. The speakerphone is also ideal for teleconferences. Speakerphones are broadly classified as Half-Duplex or Full-Duplex. Half-Duplex speakerphones allow a conversation to proceed in one direction at a time. This one way at a time conversation keeps the speaker signal from being fed back into the microphone. On the other hand, Full-Duplex speakerphones allow a conversation to proceed in both directions simultaneously. This provides the most natural feel since it is just like using a telephone handset.

In general, the speakerphone requires more microphone sensitivity and more audio speaker drive than its counterpart, the more conventional handset telephone. The increase in microphone sensitivity and audio speaker drive, however, can exacerbate the problem of speaker-microphone coupling which may adversely effect the performance of the speakerphone. In short, output from the audio speaker can undesirably feed back into the microphone to form an infinite loop. If the feedback signal is slightly out of phase with the original microphone input signal and the loop gain is more than one (1), a system oscillation may occur thereby generating an echoing or howling sound that is analogous to holding the microphone of a public announce (PA) system directly in front of the system.

In Japanese Patent Application Laid-open 62-116023, a two-wire speakerphone system with an echo canceling circuit is disclosed. The echo canceling circuit utilizes current feedback to eliminate echoing or howling problems associated with the operation of a speakerphone. In telephone systems, two-wire circuits having a single pair of separate tip and ring lines, as opposed to four-wire circuits, are used to connect a telephone to a central switching office. This connection is called a local loop which carries a direct current supplied by batteries at the central switching office. The aforementioned direct current acts as a medium to allow speech and signaling communications to be transferred over the telephone network. The speakerphone system with echo canceling from Japanese Patent Application Laid-open 62-116023 is designed for a two-wire telephone circuit and uses negative feedback current in its echo canceling circuit to minimize echoing.

On the other hand, four-wire circuits in which two wires are used for transmitting and two for receiving are used in other telephone circuits such as the telephone handset and modem interface circuits. Four-wire circuits are used when all types of transmissions (i.e., digital data and voice) are transferred over the telephone network. Moreover, while four-wire circuits are designed for low voltages, two-wire circuits are designed for use with high voltages. In particular, two-wire circuits of telephone lines occasionally are known to carry up to 1500 volts when they come in contact with a live high-voltage power line. As a result, for safety and other reasons, Federal Communications Commission (FCC) Part 68 Specification for the telephone system requires that circuits and devices that are connected to high voltage portions of the telephone line such as two-wire circuits must be able to withstand a high-voltage exposure of up to 1500 volts. This requirement greatly effects the design, construction, and integration of circuits and devices connecting to high voltage portions of the telephone line. Because the echo canceling circuit from Japanese Patent Application Laid-open 62-116023 is designed for high voltages, its design and construction present technical and integration challenges particularly with its implementation in an integrated semiconductor chip. Moreover, the current feedback characteristic of the echo canceling circuit from Japanese Patent Application Laid-open 62-116023 presents a challenge to implement efficiently and inexpensively in a four-wire telephone circuit.

SUMMARY OF THE INVENTION

Accordingly, one object of the present invention is an echo canceling circuit which could be integrated easily and cost effectively into an integrated semiconductor chip.

Another object of the present invention is an echo canceling circuit which could be implemented easily and cost effectively into the four-wire (low voltage) portion of the telephone lines.

These and additional objects are accomplished by the various aspects of the present invention, wherein briefly stated, one aspect of the present invention is a system oscillation canceling apparatus which can be used to minimize howling and echoing caused by acoustic coupling during operation of a speakerphone. Included in the system oscillation canceling apparatus are: a modem having a receive line coupled to a communication device for receiving information from the communication device and a transmit line coupled to the communication device for transmitting information to the communication device, the receive and transmit lines each having a pair of signal wires of opposite polarity; acoustic transducer means coupled to the modem for receiving and producing sounds; and cancellation means coupled to the modem and the acoustic transducer means for canceling acoustical induced system oscillation.

The cancellation means further includes: a first amplifier connected to the pair of transmit signal wires for detecting and scaling transmit signals from the pair of transmit signal wires, the first amplifier outputting scaled transmit signals; a phase shifting circuit receiving as input the scaled transmit signals for changing a phase of the transmit signals, the phase shifting circuit outputting phase shifted transmit signals; a second amplifier connected to the pair of receive signal wires for detecting and scaling receive signals from the pair of receive signal wires, the second amplifier outputting scaled receive signals; and a summing amplifier receiving the phase shifted transmit signals and the scaled receive signals as inputs, the summing amplifier outputting signals which are a sum of scaled signals of the phase shifted transmit signals and scaled signals of the scaled receive signals; the output signals are sent to the acoustic transducer means.

Preferably, the modem is a data/fax/voice modem. Moreover, it is preferable that the transmit signal wires are polar correctly coupled to the inverting and non-inverting input terminals of the first amplifier and wherein the receive signal wires are polar reversely coupled to the inverting and non-inverting input terminals.

If the communication device is a cellular radio, the above apparatus further includes an interface circuit having: a first amplifier for connecting the transmit line to the cellular radio and for converting the pair of transmit signal wires to a single line for output to the cellular radio; and second and third amplifiers for connecting the cellular radio to the receive line and for converting a single line input received from the cellular radio to the pair of receive signal wires for the receive line.

Another aspect of the present invention is a computer system coupled to a communication device including: a host processor; an input/output interface coupled to the host processor; a modem connected to the input/output interface; the modem having a receive line coupled to a communication device for receiving information from the communication device and a transmit line coupled to the communication device for transmitting information to the communication device, the receive and transmit lines each having a pair of signal wires of opposite polarity; acoustic transducer means coupled to the modem for receiving and producing sounds; and cancellation means coupled to the modem and the acoustic transducer means for canceling acoustical induced system oscillation.

The cancellation means includes: a first amplifier connected to the pair of transmit signal wires for detecting and scaling transmit signals from the pair of transmit signal wires, the first amplifier outputting scaled transmit signals; a phase shifting circuit receiving as input the scaled transmit signals for changing a phase of the transmit signals, the phase shifting circuit outputting phase shifted transmit signals; a second amplifier connected to the pair of receive signal wires for detecting and scaling receive signals from the pair of receive signal wires, the second amplifier outputting scaled receive signals; and a summing amplifier receiving the phase shifted transmit signals and the scaled receive signals as inputs, the summing amplifier outputting signals which are a sum of scaled signals of the phase shifted transmit signals and scaled signals of the scaled receive signals; the output signals are sent to the acoustic transducer means.

If the communication device is a cellular radio, the above computer system further comprises an interface circuit having: a first amplifier for connecting the transmit line to the cellular radio and for converting the pair of transmit signal wires to a single line for output to the cellular radio; and second and third amplifiers for connecting the cellular radio to the receive line and for converting a single line input received from the cellular radio to the pair of receive signal wires for the receive line.

Still another aspect of the present invention is a method for canceling system oscillations caused by acoustical coupling, comprising: coupling an audio signal from a microphone to a modem; amplifying a differential receive voltage signal from a communication device to produce an amplified differential receive voltage signal; shifting a phase of the amplified differential receive voltage signal to produce a phase shifted amplified differential receive voltage signal; amplifying a differential transmit voltage signal from the modem to produce an amplified differential transmit voltage signal; adding the phase shifted amplified differential receive voltage signal to the amplified differential transmit voltage signal to produce an output signal; and providing the output signal to a speaker.

Preferably, the shifting step further comprising: reversing a polarity of the differential receive voltage signal relative to a polarity of the differential transmit voltage signal thereby causing the differential receive voltage signal to be out of phase with the differential transmit voltage signal; and fine-adjusting the differential transmit voltage signal to cause the differential transmit voltage signal to be substantially 180 degrees out of phase with the differential transmit voltage signal.

Yet, another aspect of the present invention is an apparatus for connecting to a communication device for emulating a telephone. The apparatus comprises: a modem for receiving information from and for transmitting information to the communication device, the communication device including receive and transmit lines, the modem including a processor for processing signals, the processor having an input and an output; an acoustic transducer coupled to the modem for receiving and producing sounds; and a connection circuit.

The connection circuit includes: summing means, having a first input coupled to the receive line for receiving a first input signal and a second input for receiving a second input signal from a microphone means, the summing means for summing the first and second input signals and applying the summed signals to an earphone means, the microphone means coupled to the transmit line; analog-to-digital conversion means, having a first input connected to the microphone means and a second input coupled to the receive line, for converting signals from analog-to-digital, the analog-to-digital conversion means having an output connected to the input of the processor; and digital-to-analog conversion means having an input connected to the output of the processor for converting digital signals from the processor to analog signals; wherein the second input of the summing means is connected to an output of the digital-to-analog conversion means, and wherein the microphone means is coupled to the transmit line through the analog-to-digital conversion means, the processor, and the digital-to-analog conversion means.

DETAILED DESCRIPTION OF THE INVENTION

Figure 7:
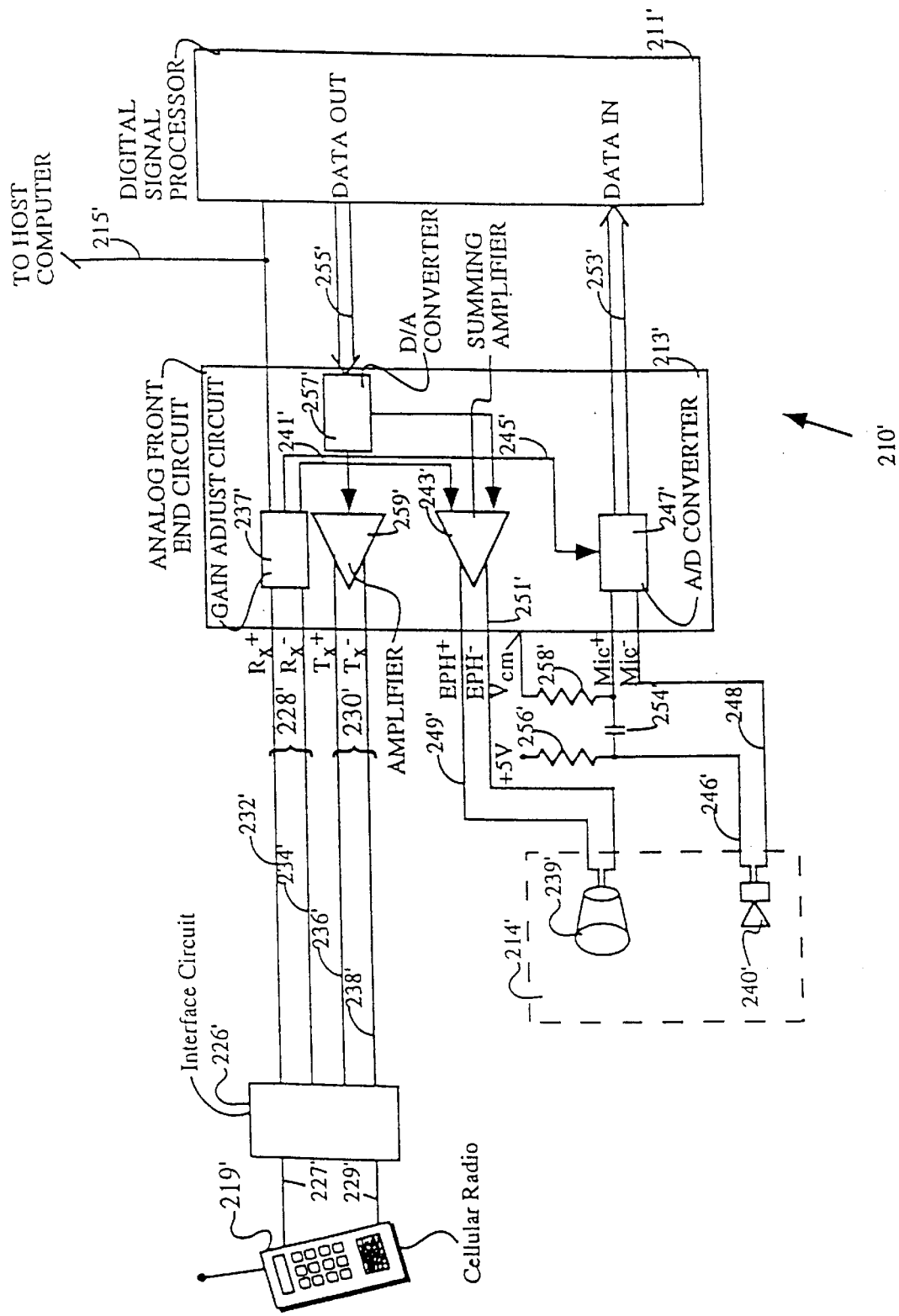
FIG. 7 is a block diagram, partially in schematic form, of an embodiment of FIG. 5, wherein the emulator circuit includes a digital signal processor.
Figure 8:
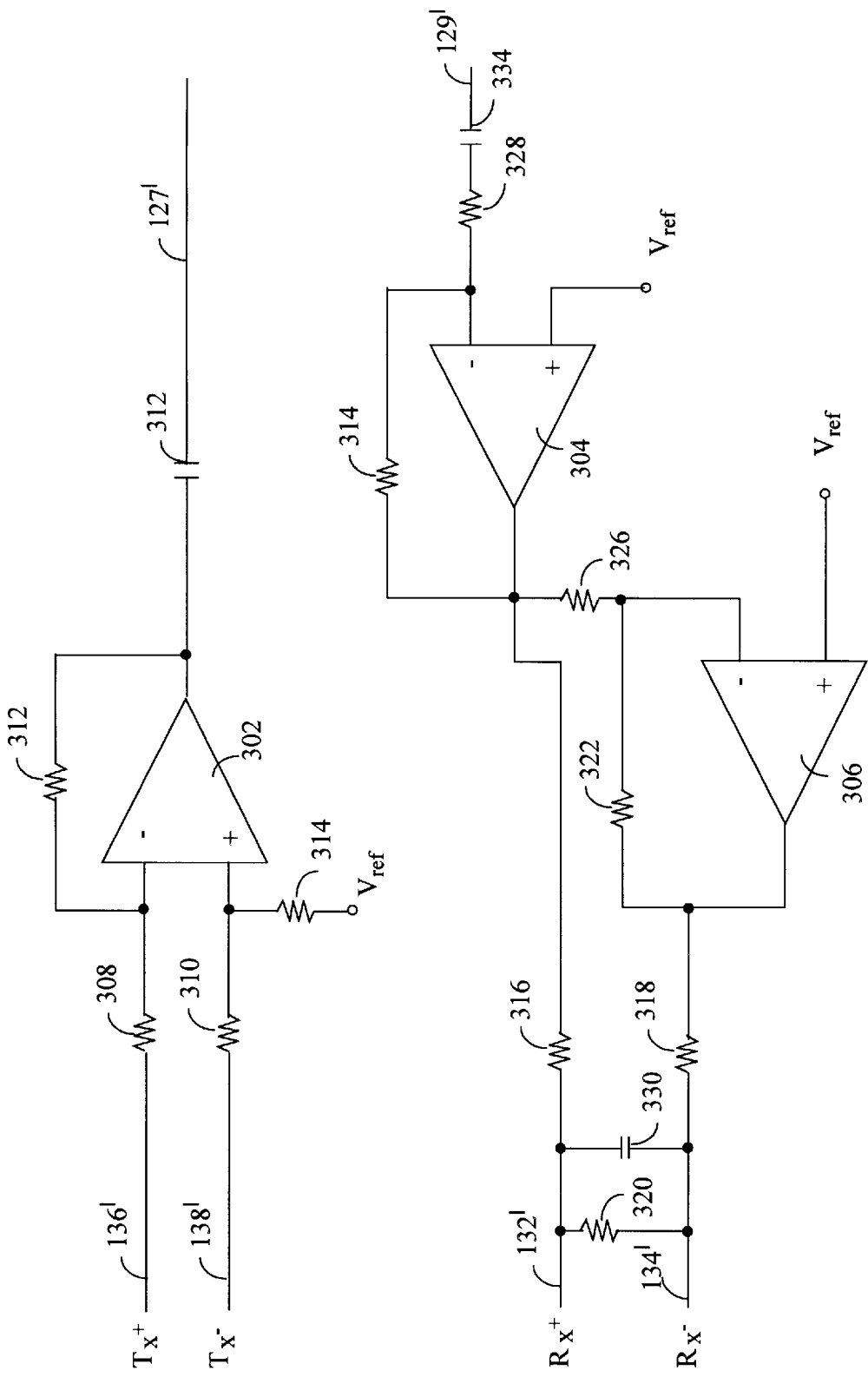
FIG. 8 is a schematic diagram of an interface circuit appropriate for use in the embodiments of FIGS. 6 and 7.
Figure 9:
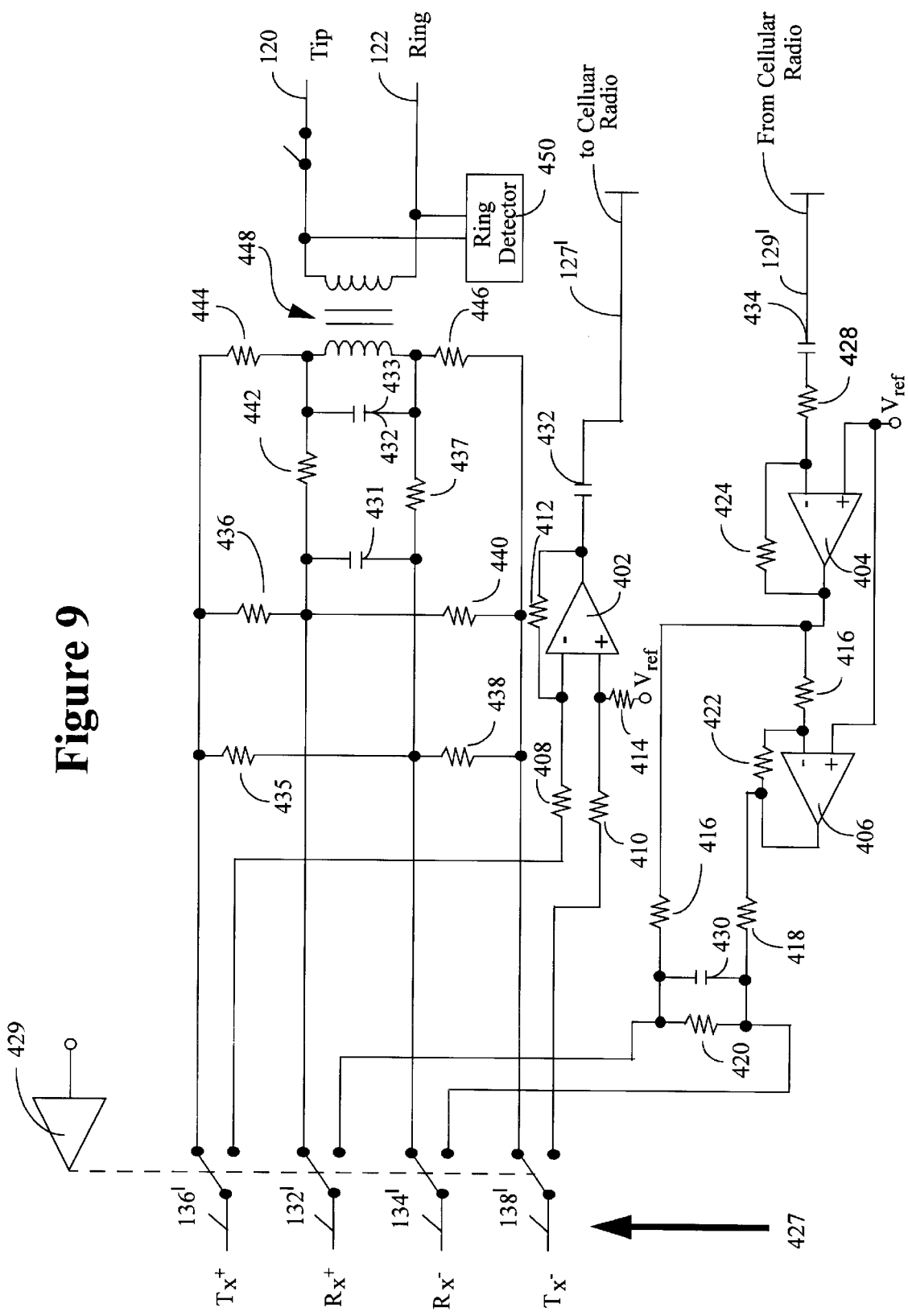
FIG. 9 is a schematic diagram of an alternative embodiment of the interface circuit of FIG. 8 which allows the system to be selectively connected to either a telephone line or a cellular radio.

Referring to FIGS. 2–9, preferred embodiments of the invention will now be described. FIGS. 2–4c illustrate a system having a data/fax/voice modem, a host computer, a telephone headset, and a telephone emulator circuit connected to a telephone line. FIGS. 5–8 illustrate embodiments of the invention connected to a non-land line based communication device, specifically a cellular radio. FIG. 9 illustrates an embodiment which connects to enter a telephone line or a cellular radio.

Figure 1:
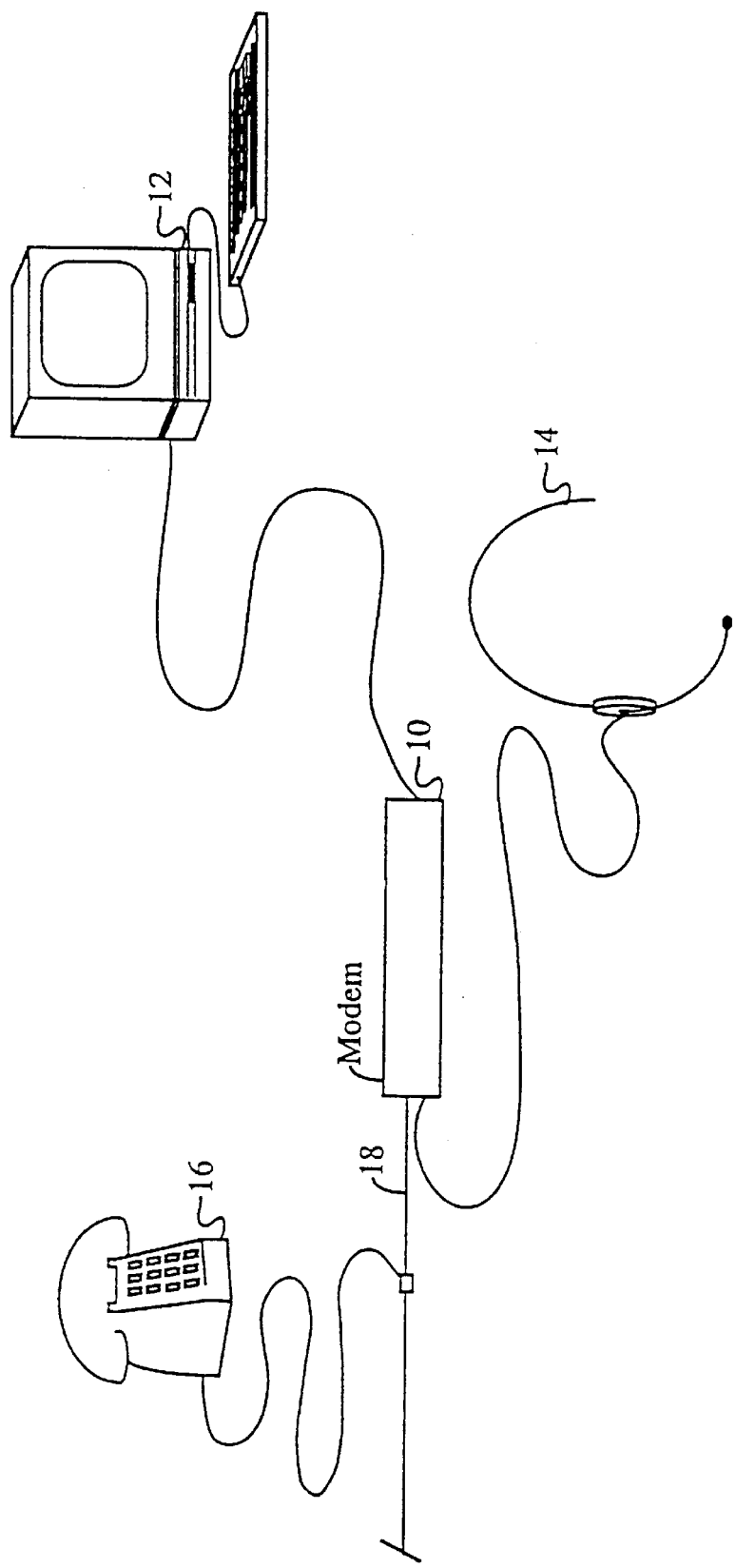
FIG. 1 is a block diagram illustrating a prior art system employing a host computer, a modem, a telephone headset and a separate telephone.
Figure 2:
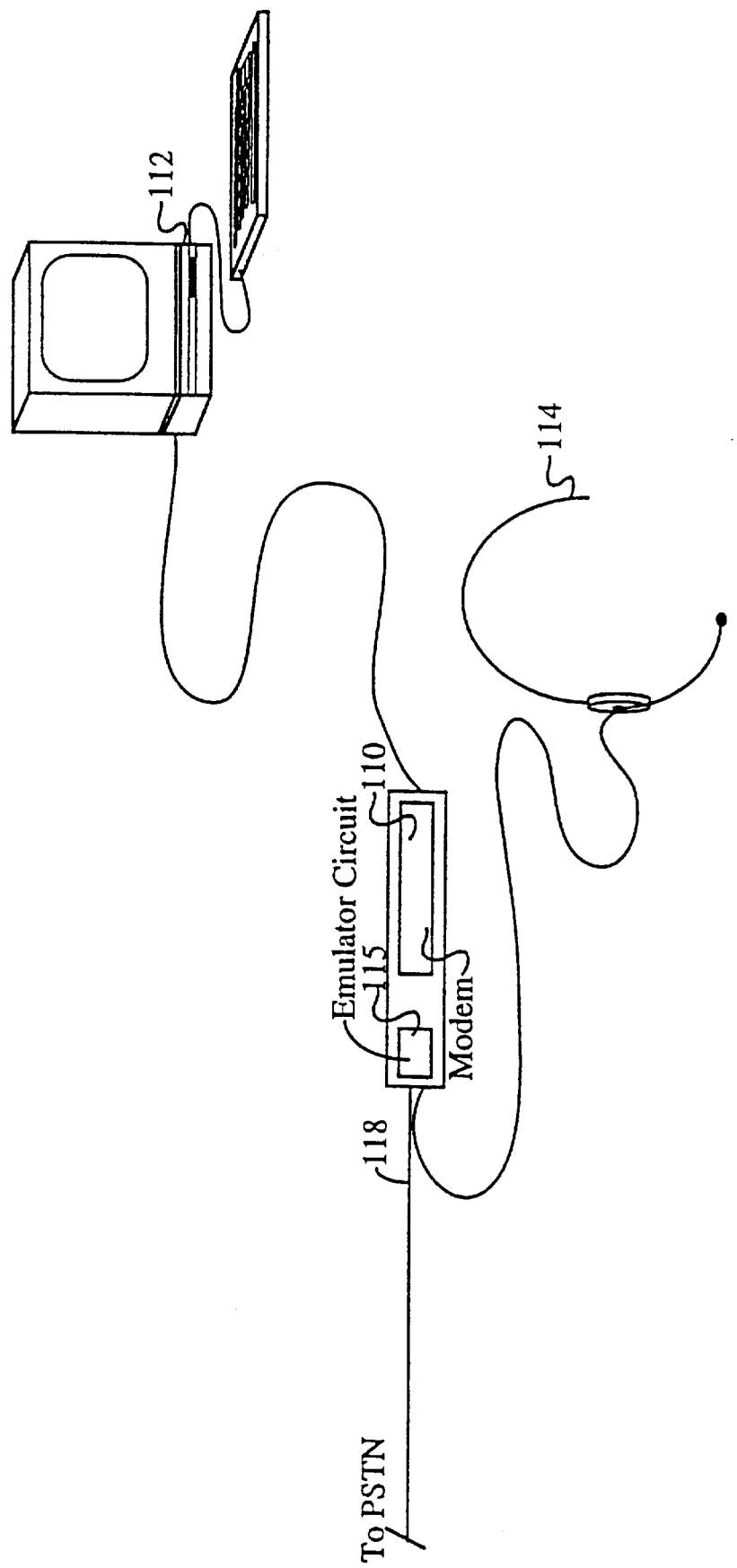
FIG. 2 is a block diagram illustrating an embodiment of the invention wherein a system is provided with a modem, a host computer, a telephone headset and an emulator circuit for enabling the system to emulate the functions of a telephone while connected to a telephone land line.

More specifically, FIG. 2 provides a high level block diagram of a system having a data/fax/voice modem 110, a host computer 112, a telephone headset 114, a telephone emulator circuit 115 and a telephone line 118 connected to a PSTN is illustrated. Emulator circuit 115, in connection with a properly programmed host computer 112, provides a connection means which allows modem 110 and headset 114 to emulate the functions of the telephone, eliminating the need to provide a separate telephone, such as telephone 16 of FIG. 1. When placing a voice telephone call, emulator circuit 115 connects headset 114 to line 118. The telephone number to be called, entered using computer 112, is dialed by modem 110. For an incoming voice telephone call, emulator circuit 115 connects either headset 114 or modem 110 to line 118. With headset 114 connected to line 118, direct conversation with the far-end party initiating the telephone call is accommodated. With modem 110 connected to line 118, automated answering machine capabilities of data/fax/voice modem 110 are employed to record an incoming voice message. During automated data communications, including fax communications, headset 114 is disconnected from line 118 and all data is processed through modem 110. These features, and the specific design of emulator circuit 115 are set forth more fully below in the remaining figures. As far as FIG. 2 is concerned, it should be noted that, although FIG. 2 illustrates a separate emulator circuit and a modem, the components may be combined as a single unit. FIG. 2 is provided to illustrate the functionality of the various components and should not be taken to imply any necessary physical configuration. Furthermore, although FIG. 2 illustrates a telephone headset, alternative devices, such as a telephone handset may be employed, and, in general, any acoustic transducer device may be employed to provide the functions of headset 114.

Figure 3:
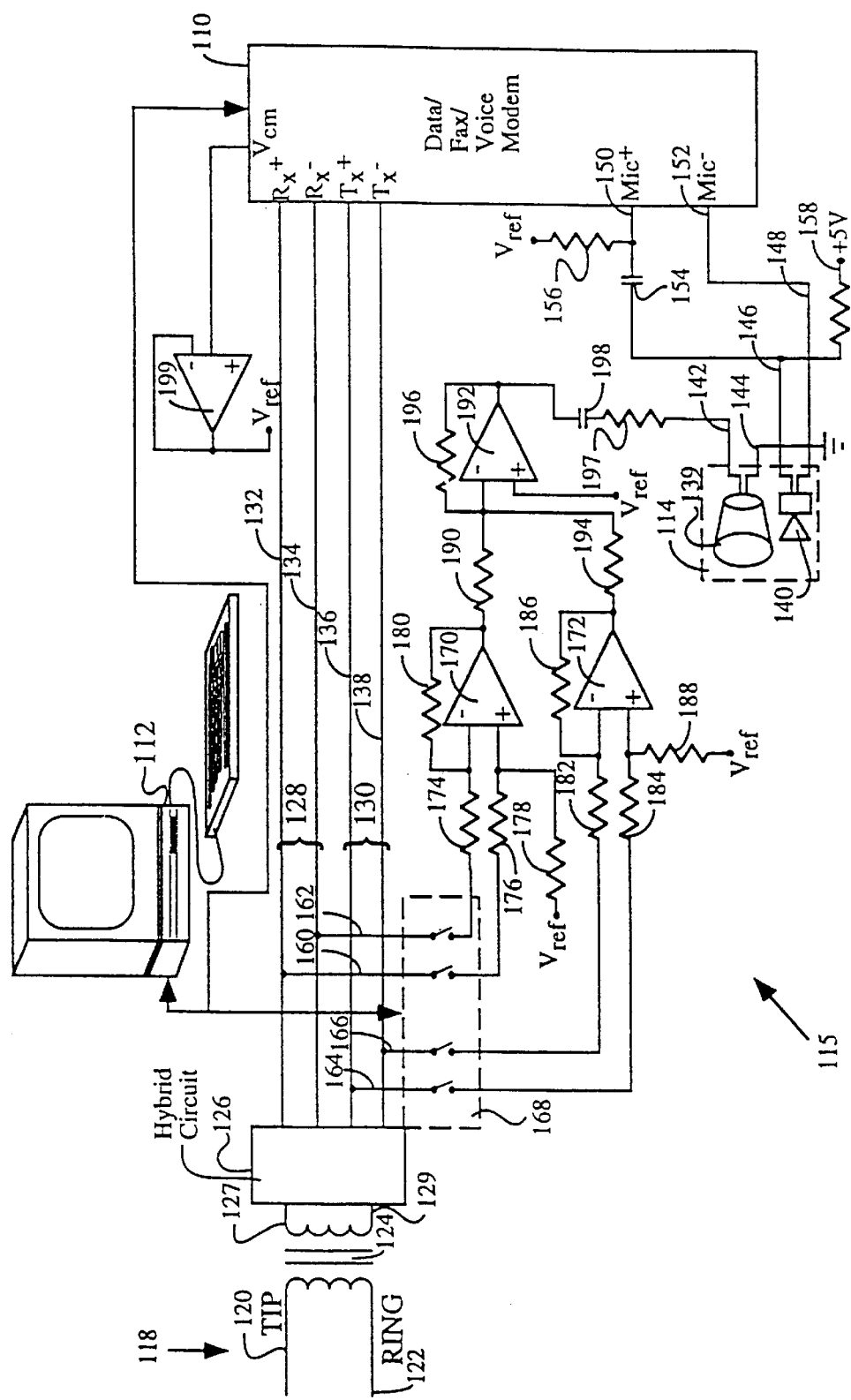
FIG. 3 is a block diagram, partially in schematic form, of an embodiment of the system of FIG. 2, wherein the emulator circuit includes analog components.

Referring now to FIG. 3, a first preferred embodiment of the invention will be described. Telephone line 118 is composed of separate tip and ring lines, 120 and 122 respectively, which are connected through a transformer 124 to a hybrid circuit 126 by lines 127 and 129. A detail description of hybrid circuit 126 is not presented here because its design and construction is well-known in the art. A schematic of a typical hybrid circuit can be found, for example, in Bigelow, "*Understanding Telephone Electronics*", pages 70–71 (3d ed. 1994) which is herein incorporated by reference.

Hybrid circuit 126 is connected to modem 110 via a receive line 128 and a transmit line 130. Receive line 128 is composed of a separate $R_x^+$ and $R_x^-$ lines, respectively denoted 132 and 134. Transmit line 130 is composed of separate $T_x^+$ and $T_x^-$ lines, respectively denoted 136 and 138. The four individual lines of the receive and transmit lines 128 and 130 are connected via hybrid circuit 126 to lines 127 and 129 which are connected transformer 124 and vise versa.

Modem 110 is a data/fax/voice modem capable of placing telephone calls by taking line 118 off-hook and initiating a call using either pulse or DTMF dialing. For clarity, not all circuitry required to place telephone calls is illustrated in FIG. 3. Although a variety of conventional modems may be employed, the invention is preferably used in connection with a CL-MD9624 or CL-MD1414 modem provided by Cirrus Logic, Inc., the Assignee of rights to the present invention. The CL-MD9624 modem is provided with the aforementioned $R_x^+$, $R_x^-$, $T_x^+$ and $T^-$ ports, as well as a pair of microphone ports Mic$^+$ or Mic$^-$ described below. For modems lacking such ports, some additional circuitry or other modifications may be required.

In FIG. 3, headset 114 is illustrated as having an earphone 139 and a microphone 140. Each is provided with a pair of connection lines. Earphone 139 is connected to input lines 142 and 144. Microphone 140 is connected to output lines 146 and 148. The output lines of microphone 140 are connected to a pair of microphone input ports Mic$^+$ or Mic$^-$ 150 and 152, of modem 110. Line 148 is directly connected to MIC$^-$ port 152. Line 146, is split into two lines, one of which is connected to MIC$^+$ port 150 via a capacitor 154. A resistor 156 is connected from between capacitor 154 and port 150 to a $V_{ref}$ source. The other path of line 146 is connected through a resistor 158 to a +5 volt source. Resistors 158 and 156 and capacitor 154 provide for proper biasing and coupling of microphone 140 to modem 110.

With these interconnections, voices or other sounds picked up by microphone 140 are transmitted into the Mic$^+$ and Mic$^-$ microphone ports of modem 110. Modem 110 includes conventional circuitry for processing the signals received through the microphone inputs, and, in particular, circuitry for routing the signals received through the microphone inputs to the transmit output ports. If modem 110 is provided with an answering machine capability, then circuitry is also provided for recording a greeting received through microphone 140 for use with the answering machine functions. Also, modem 110 is preferably provided with the circuitry for controlling the gain of the signal received through the microphone ports for use in adjusting the level of an output signal generated along transmit lines 130. In this regard, modem 110 may accept conventional commands provided from computer 112 for adjusting the gain. In any case, once a telephone call has been initiated by modem 110, voice signals picked-up by microphone 140 are routed to transmit lines 130 then connected via hybrid 126 and transformer 124 to the tip and ring lines of output line 118 for transmission to the far-end party.

A circuit through which voice signals, received along the tip and ring lines of line 118 from the far-end party, are routed to earphone 139 will now be described with continued reference to FIG. 3. A pair of lines 160 and 162 are tapped into lines 132 and 134 of receive line 128. Likewise, a pair of lines 164 and 166 are tapped into lines 136 and 138, respectively, of transmit line 130. Lines 160 and 162 are also connected through a switch 168 into an amplifier 170 with lines 162 and 160 connected to negative and positive terminals, respectively of amplifier 170. Lines 164 and 166 are connected through switch 168 to a second amplifier 172, with lines 164 and 166 connected to the positive and negative input terminals of amplifier 172 respectively.

Switch 168 is operated under control of host computer 112 or, although not shown, under direct control of modem 110. Switch 168 operates to disconnect earphone 139 from the receive and transmit lines during data or facsimile transmissions. However, during voice transmissions, switch 168 is closed to allow voice messages carried along the receive and transmit lines to be heard through earphone 139. In this regard, both incoming messages from receive line 128 and outgoing messages from transmit line 130 are connected into earphone 139. Thus, an echo or side-tone capability is provided wherein the sounds received by microphone 140 are heard through earphone 139, as with a normal telephone.

Amplifier 170 is interconnected with lines 160 and 162 and a circuit having resistors 174, 176, 178 and 180. As shown, resistor 174 and 176 are connected, along lines 162 and 160 respectively. Resistor 180 is connected in parallel with amplifier 170 between a negative input and an output of the amplifier. Resistor 178 is connected between the positive input of amplifier 170 and a $V_{ref}$ source. Together amplifier 170 and resistors 174, 176, 178 and 180 form a differential-to-single ended converter that senses a received signal on receive line 128 and provides a single output signal having an appropriate voltage gain. The amount of voltage gain is determined by parameters for the resistors and amplifier 170, in accordance with conventional techniques.

Amplifier 172 is interconnected with resistors 182, 184, 186 and 188 to form a second differential-to-single ended converter for sensing a transmitted signal along transmission line 130. Resistors 182 and 184 are connected along lines 166 and 164 respectively. Resistor 186 is connected in parallel with amplifier 172 between a negative input of the amplifier and an output of the amplifier. Resistor 188 is connected between the positive input of the amplifier and a $V_{ref}$ source. As with amplifier 170, amplifier 172 and its associated resistors operate to adjust the voltage gain of signals received along transmit line 130.

The single output of amplifier 170 is connected through a resistor 190 into a negative input of a third amplifier 192. The single output of amplifier 172 is connected through a resistor 194 also into the negative input of amplifier 192. A positive input of amplifier 192 is connected directly to $V_{ref}$. A resistor 196 is connected in parallel between the negative input of amplifier 192 and output of the amplifier. Together, amplifier 192 and resistors 190, 194 and 196 form a summing amplifier that scales and sums signals received from amplifiers 170 and 172 to provide a single signal which includes both the received signal from receive line 128 and the transmit signal from transmit line 130. The single output of amplifier 192 is connected through a capacitor 198 and a resistor 197 into one of the inputs to earphone 139 along line 142. Capacitor 198 provides DC blocking and resistor 197 provides gain adjustment for earphone 139. The second line connected to earphone 139, that is line 144, is connected directly to a ground.

FIG. 3 also illustrates a fourth amplifier 199. A positive input of amplifier 199 is connected into a standard $V_{cm}$ port of modem 110. An output of amplifier 199 is connected to $V_{ref}$. A line interconnects a negative input of amplifier 199 to the output of amplifier 199. Amplifier 199 operates as a unity gain amplifier to buffer the common mode voltage, $V_{cm}$, to provide a proper DC bias for the overall modem and circuitry.

The various switches, amplifiers, resistors and capacitors connected between earphone 139 and receive and transmit lines 128 and 130 operate to feed a receive and a small amount of transmit signal (sidetone signal) to the earphone during voice communications. Although the particular combination of circuit components illustrated in FIG. 3 is effective for transmitting the receive and sidetone signals to earphone 139, alternative circuit configurations may also be employed. Furthermore, although switch 168 is shown as switching both the transmit and receive feed lines, the transmit line need not be switched. In other words, switch 168 need not operate on lines 164 and 166. No switching of the transmit line is needed since the input impedance is high enough that no significant loading occurs. However, switching of lines 164 and 166 is preferred since switching prevents data and fax transmission signals from being heard through earphone 138 when the system is operating in a data or fax transmission mode.

In use, when one wishes to place a telephone call, appropriate commands are entered through host computer 112 for entering the telephone number to be dialed. The telephone number may be either entered through a keyboard or selected from a list of previously entered numbers. The telephone number, and various other appropriate control signals are transmitted to modem 110 for initiating a telephone call. Simultaneously, a control signal is sent to switch 168 causing the switch to close for connecting earphone 139 to receive and transmit lines 128 and 130. Modem 110 responds to control signals provided by computer 112 to take telephone line off-hook and place the telephone call using conventional dialing capability. Once the telephone call is connected, voice messages received from the far-end party are heard through earphone 139. The caller responds by speaking into microphone 140. As noted above, the microphone signal is fed through modem 110 and output along transmission line 130, then along telephone 118 to the far end party. During the telephone conversation, data and fax transmission capabilities of modem 110 are not employed. Once the telephone call is completed, the operator enters a command within computer 112 which sends appropriate control signals to modem 110 for placing telephone line 118 on-hook. Simultaneously, switch 168 is opened to disconnect earphone 139 from the receive and transmit lines.

Commands for initiating the telephone call and for ending the telephone call are provided in accordance with conventional programming techniques. In this regard, modem 110 is preferably of the type capable of receiving and processing basic data modem "AT" commands. With such capability, computer 112 is provided with software for transmitting the appropriate "AT" commands to the modem. For modems which do not process conventional "AT", commands, alternative programming may be required. However, such can be provided by those of ordinary skill in the art. The programming of computer 112 and the specific interconnections between switch 168, modem 110 and computer 112 will not be described in further detail.

When an incoming telephone call is received, modem 110 detects the telephone call, takes telephone line 118 off-hook, then determines whether the incoming telephone call contains an automated data or fax message or a regular voice message. If the incoming message is a data or fax message, switch 168 is kept open, and modem 110 processes the incoming data in accordance with conventional techniques. In this regard, modem 110 and host computer 112 may operate to store the data or fax message within a hard disk drive of computer 112. For fax messages, a separate facsimile print-out device may be provided for immediately printing the fax message, without requiring that the fax be stored in a memory device.

For any incoming call, modem 110 provides a ring sound through a speaker, not shown, to notify the operator of the modem that a call is being received. Also, a signal maybe transmitted to switch 168 closing the switch to allow the operator to hear the incoming message. If modem 110 is provided with an answering machine capability, the operator then has a choice to either allow the modem to record a message or to bypass the modem and converse directly with the calling party. Although this feature may be implemented in a number of ways, the system is preferably configured to allow modem 110 to initially answer the telephone call using the answering machine capability. The operator has the option of overriding the answering machine function by entering appropriate commands at computer 112. Once the appropriate commands are entered, a signal is transmitted to modem 110 from computer 112 deactivating the answering machine operation of modem 110. In this manner, the operator can answer the incoming voice message directly or allow the modem to answer the telephone call automatically. Of course, if the operator is not present, no override commands will be entered in the host computer and the modem will automatically operate to record a voice message. In other implementations, the modem can be configured to allow all incoming signals to be heard through the speaker.

Figure 4A:
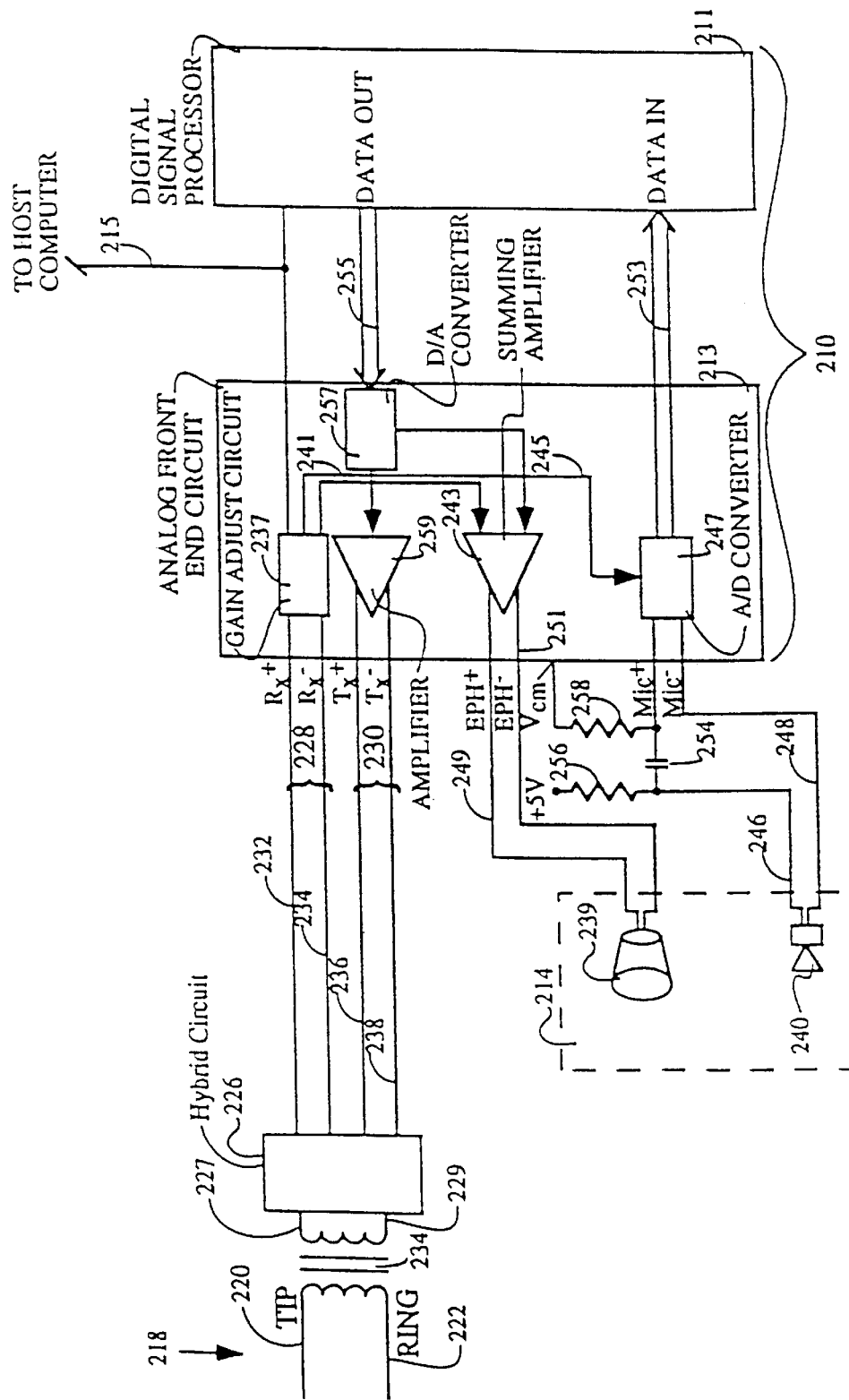
FIG. 4a is a block diagram, partially in schematic form, of an alternative embodiment to the system of FIG. 2, wherein the emulator circuit includes a digital signal processor.

Referring to FIG. 4a, an alternative embodiment to the telephone emulator circuit will now be described. FIG. 4a illustrates a modem 210 having a digital signal processor 211 and a front end circuit 213. Digital signal processor 211 provides for traditional digital modem functions. Front end circuit 213 provides for digital-to-analog and analog-to-digital conversion and also provides circuitry to allow telephone emulation, i.e., front end 213 performs the functions of emulator circuit 115 of FIG. 3. Front end circuit 213 and digital signal processor 211 are preferably fabricated as separate circuits as shown in FIG. 4a, or as single integrated circuit.

Considering digital signal processor 211 in greater detail, processor 211 performs all the functions of the data/fax/voice modem 110 of FIG. 3, excluding analog-to-digital and digital-to-analog conversion functions now incorporated within a front end circuit. Although processor 211 may be implemented in a variety of ways, preferably processor 211 is a CL-MD1224, 1024, 1224, 1824, 1214/2614, or 1814/2614 digital signal processing chip or chip set provided by Cirrus Logic, Inc of Fremont, Calif. As with the modem of FIG. 3, processor 211 of FIG. 4a receives commands from a host computer (not shown) along a control line 215. Also, circuitry for interconnecting modem 210 to a telephone line 218 is identical to that of FIG. 3. Namely, telephone line 218 is composed of separate tip and ring lines 220 and 222, respectively. Tip and ring lines 220 and 222 are connected through a transformer 234 into a hybrid circuit 226 via lines 227 and 229. Hybrid circuit 226 provides two-to-four line conversion for connection to receive and transmit lines 228 and 230. Receive line 228 is composed of separate $R_x^+$ and $R_x^-$ lines 232 and 234, respectively. Transmit line 230 is composed of separate $T_x^+$ and $T_x^-$ lines, 236 and 238, respectively.

Receive lines 232 and 234 are connected to a gain adjust circuit 237. Gain adjust circuit 237 also receives control signals from the host computer along control line 215. Gain adjust circuit 237 adjusts the gain of the received signal in response to control signals received from the computer. Gain adjust circuit 237 then outputs the received signal along either a line 241 to a summing amplifier 243 or along a line 245 to an analog-to-digital conversion circuit 247.

Outputs of summing amplifier 243 are connected through ports EPH$^+$ and EPH$^-$ along lines 249 and 251 to an earphone 239. Hence, when received signals are output from gain adjust circuit 237 along line 241, the received signals are then provided to an operator through earphone 239. Thus, for voice telephone calls, the computer controls gain adjust circuit 237 to route the received voice signals to the earphone. For data communications, the computer controls gain adjust circuit 237 to route the received signals along line 245 to the analog-to-digital converter 247. Analog-to-digital converter 247 converts the analog data received along line 245 to digital data for transmission to a data-in port of processor 211 along a bus line 253. Processor 211 processes the digital data in accordance with conventional modem processing techniques for possible storage within a hard disk drive of the computer. For clarity, not all necessary data bus lines between processor 211 and the computer are shown in FIG. 4a. Output data for transmission to telephone line 218, provided by processor 211, is output along a second bus line 255 to front end circuit 213 where the data is converted to analog signals by a digital-to-analog converter 257. Once converted to an analog signal, the data is transmitted to an amplifier 259 which is, in turn, connected to $T_x^+$ and $T_x^-$ lines 236 and 238. In this manner, data provided by processor 211 is converted from digital signals to analog signals and output along transmission line 230 for connection to telephone line 218 through a hybrid circuit 226 and transformer 234.

In addition to receiving input from gain adjust circuit 237, analog-to-digital converter 247 also receives a pair of inputs from a microphone 240. More specifically, two transmission lines 246 and 248 are connected between microphone 240 and analog-to-digital converter 247 through ports Mic$^+$ and Mic$^-$. Line 248 is connected directly into the analog-to-digital converter and provides a Mic$^-$ signal. Line 246 includes a capacitor 254 and a pair of resistors 256 and 258. Resistor 256 is connected between line 246 and a 5-volt source. Resistor 258 is connected between line 246 between capacitor 254 and converter 247, and is connected into a VCM port of front end circuit 213. Conventional VCM circuit interconnections within front end circuit 213 are, for clarity, not shown in FIG. 4a.

In use, voice signals detected by microphone 240 are converted from analog-to-digital by converter 247 then transmitted into processor 211. Processor 211 performs any desired filtering or processing of the voice signal, including gain adjustment, and outputs a digital voice signal along bus line 255. The digital voice signal is converted to analog by converter 257 then amplified onto transmission line 230 for connection to telephone line 218. The outgoing analog voice signal, provided by converter 257, is also output to summing amplifier 243, where the signal is combined with any received signals for output by earphone 239. Thus, both the incoming received signal and the outgoing side-tone voice signal are heard through earphone 239.

In an alternative embodiment, not shown, microphone 240 could be connected directly to amplifier 259 and to summing amplifier 243, rather than being routed through processor 211. In other words, an outgoing voice signal need not be routed through the processor 211. However, as noted above, by converting the outgoing voice signal to digital and transmitting the signal through the digital signal processor, the processor can adjust or filter the outgoing voice signal in a variety of ways under the control of the host computer.

As with the embodiment of FIG. 3, to initiate a telephone call, a desired telephone number is entered or selected using the host computer which sends appropriate control signals to both the processor 211 and front end circuit 213. Processor 211 controls circuitry, not shown, which takes phone line 218 off-hook and dials the selected number. Circuitry for taking the phone line off-hook and initiating the telephone call may be conventional and will not be described in further detail herein.

Received telephone calls are also processed in the same general manner as with the embodiment of FIG. 3. More specifically, when a telephone ring is detected, the system operates to take the telephone line off-hook. If the incoming call is a data or fax message, the system operates to automatically process the incoming message. As noted above, for data or fax messages, gain adjust circuit 237 is controlled to route data directly to the analog-to-digital converter 247 for conversion to digital signals which are subsequently processed by processor 211. A ring sound can be provided through a speaker, not shown, alerting an operator that a call is being is received. Automated answering machine functions of processor 211 then operate to output a greeting and record a message in response thereto. If the operator so chooses, he or she may override the automated answering machine capability and converse directly with the calling party. This is achieved by entering appropriate commands in the host computer which deactivate the answering machine functions of processor 211 and to control gain adjust circuit 237 to route data through summing amp 243 into earphone 239. Alternatively, gain adjust circuit 237 may include a multiplexer which outputs signals to both summing amp 243 and analog-to-digital converter 247. Also, depending upon the implementation telephone calls can be initiated or received by the operator without the answering function being activated.

Thus, the system of FIG. 4a operates to process incoming and outgoing data communications and to also allow for incoming and outgoing conventional telephone communications through a headset. Any software running on the host computer needed to control the digital signal processor may be provided in accordance with conventional software programming techniques. Depending upon the specific digital signal processing chip or chip set used, standard "AT" modem control commands may be employed.

Figure 4B:
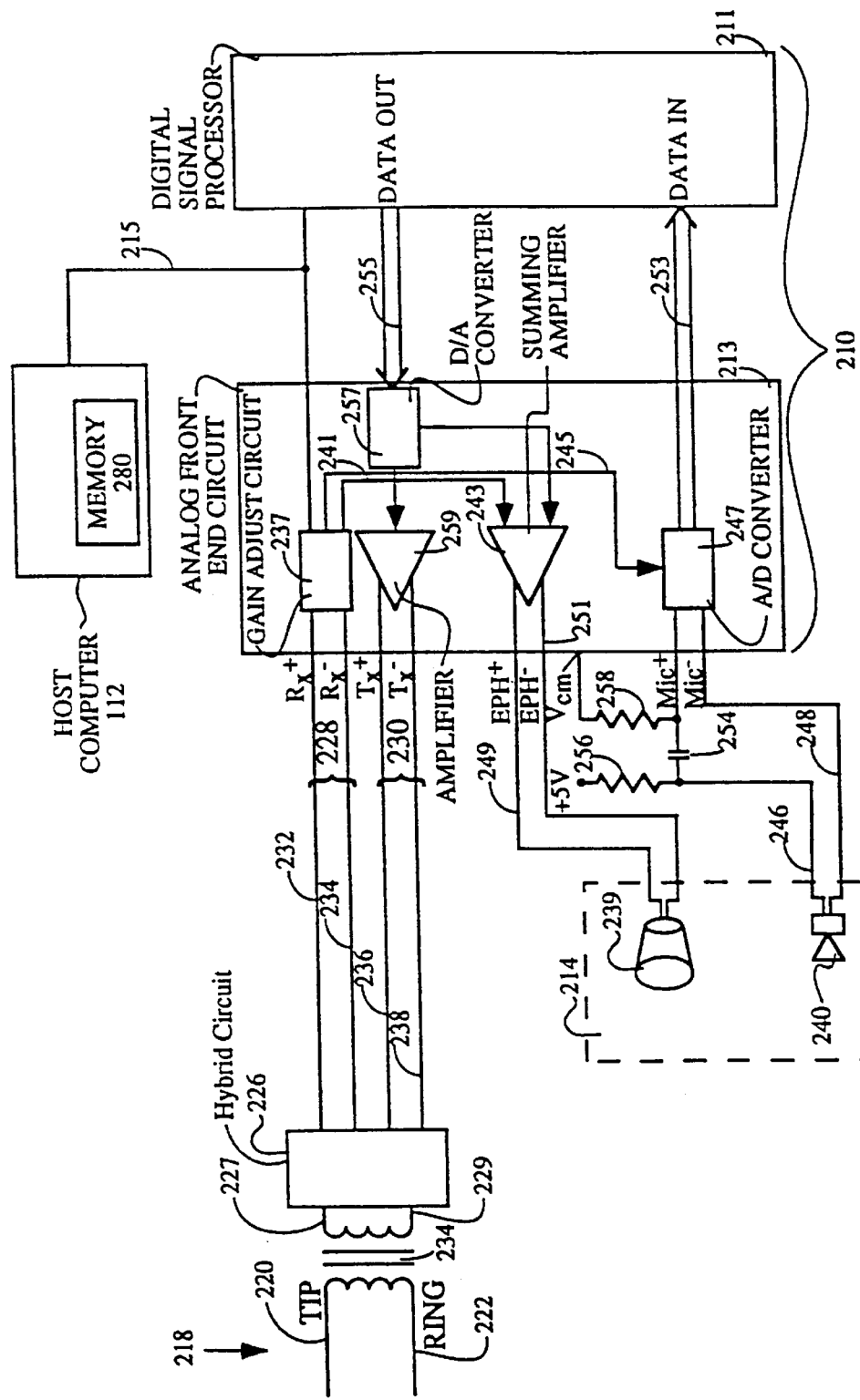
FIG. 4b is a block diagram, partially in schematic form, of an alternative embodiment to the system of FIG. 2 including a memory in a host computer.
Figure 4C:
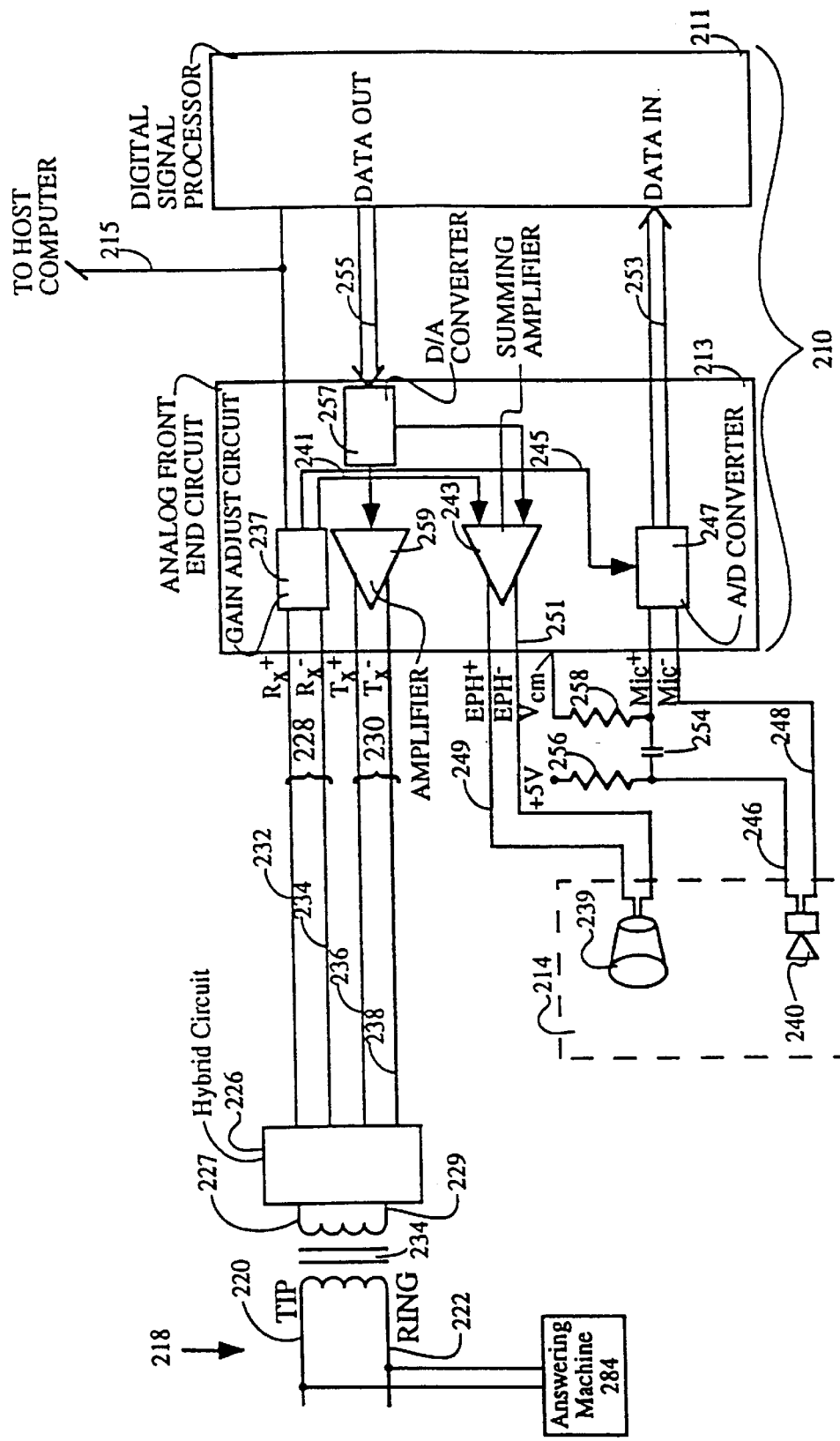
FIG. 4c is a block diagram, partially in schematic form, of an alternative embodiment to the system of FIG. 2 including an answering machine.

FIGS. 4b and 4c illustrate different schemes of storing a prerecorded greeting and of receiving and recording voice messages. FIGS. 4b and 4c are substantially the same as FIG. 4a except for a memory 280 in FIG. 4b and an answering machine 284 in FIG. 4c. In FIG. 4b, a prerecorded greeting and voice messages are stored in memory 280 which resides in host computer 112. In FIG. 4c, a prerecorded greeting and voice messages are stored in a conventional analog recording device, such as answering machine 284 having a tape recorder.

Figure 5:
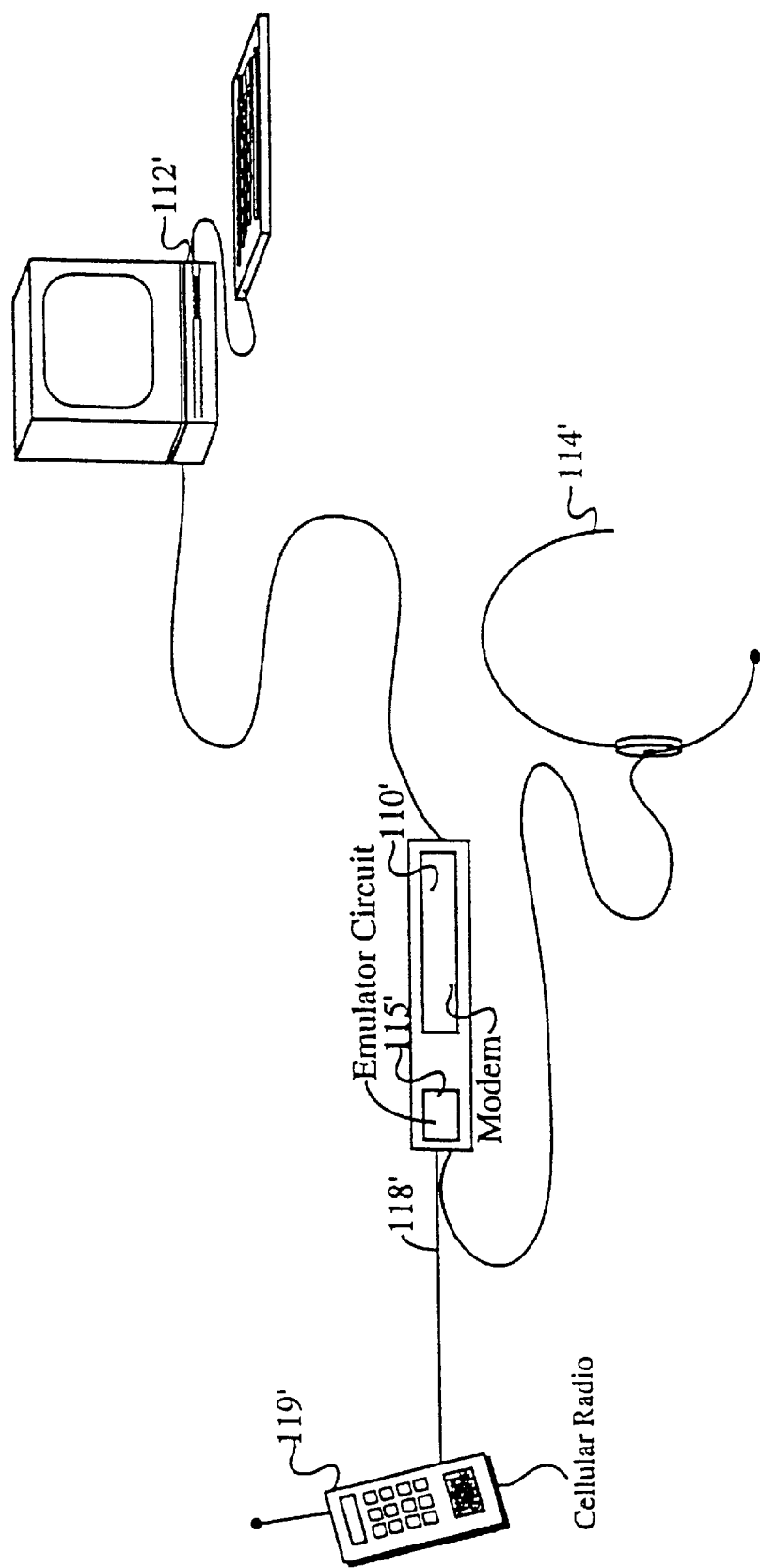
FIG. 5 is a block diagram, partially in schematic form, of an alternative embodiment of the system of FIG. 2 wherein the system is connected to a cellular radio.
Figure 6:
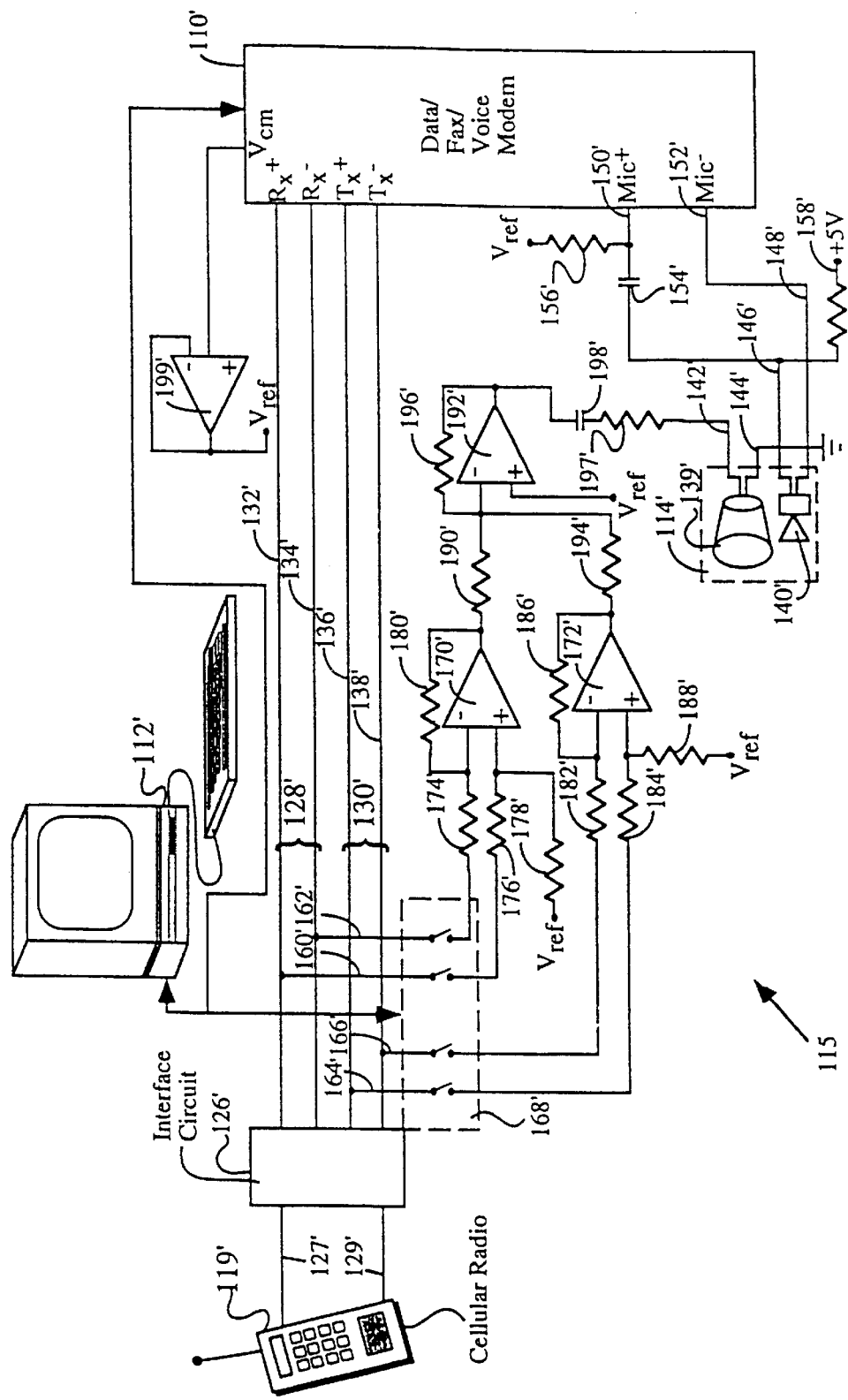
FIG. 6 is a block diagram, partially in schematic form, of an alternative embodiment of the system of FIG. 5, wherein the emulator circuit includes analog components.

Thus FIGS. 2–4c illustrate embodiments of the invention wherein the system is connected to a land-line such as a PSTN telephone line. In FIGS. 5–7 an alternative embodiment of the invention is illustrated wherein the system is connected to a non-land line based communication device such as a cellular radio. The embodiments of FIGS. 5–7 are similar to those of FIGS. 2–4c and like reference numerals are employed with primes. Most of the components of the embodiments of FIGS. 5–7 function in the same manner as those of FIGS. 2–4c and those functions will not be described in detail again. Rather, only relevant differences between the embodiments will be described.

FIG. 5 illustrates a system having a modem 110', an emulator circuit 115' connected through a connection line 118' to a cellular radio 119'. Also illustrated is a computer 112' and a telephone headset 114'. As with the system of FIGS. 2–4c, emulator circuit 115' allows modem 110', computer 112', and telephone headset 114' to emulate the functions of a telephone or similar communications device.

Although FIG. 5 illustrates a cellular radio, as an example of an non-land line based communications device, the system of FIG. 5 may be connected to any non-land line based communication means or modulation means employing any form of transmission media such as infrared, ultraviolet, radio or acoustic waves.

The cellular radio illustrated in FIG. 5 is a conventional cellular radio incorporating telephonic functions, including telephone dialing, repertory dialing, and the like. It should be appreciated that such functions need not be incorporated within cellular radio 119', since the remaining components of FIG. 5 could emulate such telephonic functions. Indeed, cellular radio 119' may include only necessary cellular radio modulation and demodulation components and need not include any telephonic functionality what so ever.

If no telephonic functionality is included within cellular radio 119', then a telephone call is initiated by computer 112' or modem 110'. If telephonic functionality is included within cellular radio 119', then a telephone call can also be initiated directly by cellular radio 119'. As with the embodiment of FIGS. 2–4c above, once a telephone call is established, outgoing messages are received either through a microphone of headset 114' or are generated by modem 110' depending upon whether the telephone call is intended to provide a digital message such as a fax or data message, or a voice message such as a direct spoken message. Responsive incoming messages received through cellular radio 119' are either routed to an earphone of headset 114', if the telephone call is a direct voice telephone call or routed into modem 110' if the telephone call is a fax or data communication.

For a telephone communication initiated by a far-end party, modem 110' operates in the same manner as the modem of FIGS. 2–4c to determine whether the incoming message contains voice, fax or data communications and then to route the message to computer system to 112' or to telephone headset 114' as appropriate. Also, as with the embodiments described above, for a voice message initiated by a far end party, modem 110' initially activates an internal answering machine capability to directly answer the voice message, unless overridden by an operator who wishes to speak directly with the far-end calling party.

FIG. 6 illustrates an embodiment of the system of FIG. 5 wherein emulator circuit 115 is configured using analog components mounted externally to modem 110'. Most components of the embodiment of FIG. 6 operate in the same manner of those of FIG. 3 and such operation will not be described in detail again. However, certain differences are worth noting. In the embodiment of FIG. 6, receive and transmit lines 128' and 130' are connected between modem 110' and interface circuit 126'. Cellular radio 119' is connected to interface circuit 126' along receive and transmit lines 127' and 129', respectively. Interface circuit 126' includes circuitry for converting signals received from cellular radio 119' on line 127' to receive signals appropriate to modem 110' along lines 128'. Likewise, interface circuit 126' includes circuitry for converting transmission signals output from modem 110' along transmission lines 130' to transmission signals appropriate for input to cellular radio 119' along line 129'.

In the embodiments described above, modem 110 operated to take telephone line 118 on-hook or off-hook as appropriate. It should be noted that modem 110' may require a somewhat different configuration or different programming to generate necessary signals for initiating or terminating communications through cellular radio 119' in accordance with specific input signals required or expected by cellular radio 119'. Additionally, modem 110' may generate further signals for controlling cellular radio 119' including signals for activating or deactivating the radio. For example, in certain implementations, it may be desirable to maintain cellular radio 119' in a low-power consuming state while communications are not being transmitted to conserve battery power. As such, modem 110' preferably generates signals necessary for "powering up" cellular radio 119' prior to initiating communications and for "powering down" cellular radio 119' after communications have terminated.

FIG. 7 illustrates an alternative embodiment of the system wherein a significant amount of circuitry is integrated into the analog front end circuit. The analog front end circuit is provided as a portion of modem 210' in connection with a digital signal processor 211'. The embodiment of FIG. 7 operates generally in the same manner as that of FIG. 4a with the same differences as noted above with respect to FIG. 6.

FIG. 8 illustrates an interface circuit for use as interface circuit 126' of the embodiment of FIG. 6 or interface circuit 226' of the embodiment of FIG. 7. The interface circuit includes three amplifiers 302, 304 and 306, along with resistors 308–328 and capacitors 330–334, connected as shown. Amplifier 302 is connected between transmission lines 136' and 138' and transmission line 127'. Amplifier 302 operates to convert positive and negative transmission signals received along lines 136' and 138' to a single transmission signal for output to cellular radio 119' (FIG. 6) along line 127'. Amplifiers 304 and 306 are connected between receive line 129' and receives lines 132' and 134'. Amplifiers 304 and 306, in combination with the various resistors and capacitors illustrated, operate to convert the single line receive signal received from cellular radio 119' (FIG. 6) along line 129' to a pair positive and negative receive signals for input into modem 110' (FIG. 6) along lines 132' and 134'.

As can be appreciated, the details of interface circuit 126' may vary according to the specific configuration of cellular radio 119' and may further vary if cellular radio 119' is replaced with another communication device such as an infrared, ultraviolet or acoustic wave based modulation or demodulation means.

The foregoing figures illustrate embodiments wherein a modem is connected to either a land-line or to a cellular radio or similar non-land-line device. FIG. 9 illustrates an interface circuit 426 for use in connecting a modem to either a telephone line or to a cellular radio or a similar device. More specifically, interface circuit 426 interconnects positive and negative receive and transmit lines 132', 134', 136' and 138' to tip and ring lines 120 and 122 and to cellular radio transmit and receive lines 127' and 129'. A switch 427 is provided along receive and transmit lines 132'–138' for connecting the receive and transmit lines either to circuitry connected to tip and ring lines 120 and 122 or to separate circuitry connected to cellular radio transmit and receive lines 127' and 129'. A switch control device 429 controls the operation of switch 427. Although not shown, switch control 429 may be connected to a manual switch for allowing a user to switch between telephone line operation or cellular radio operation. Alternatively, switch control 429 may be connected to the modem or to the computer to allow for automated switching. The method or mechanism by which switch control 429 is connected to a manual switch or the modem or computer may be provided in accordance with conventional switching techniques and such techniques will not be described in detail herein.

As noted, one circuit is provided for connecting receive and transmit lines 132'–138' to tip and ring lines 120 and 122, whereas a second circuit is provided for connecting receive and transmit lines 132'–138' to cellular radio receive and transmit lines 127' and 129'. Specific circuit elements interconnected to tip and ring lines 120 and 122 include capacitors 431 and 433, and resistors 435, 436, 438, 440, 442, 444 and 446, interconnected as shown. The foregoing elements operate to combine the four separate receive and transmit lines 132'–138' into a single input to a transformer 448 which is connected directly to tip and ring lines 120 and 122. A ring detector 450 may be connected directly to tip and ring lines 120 and 122 for detecting an incoming ring signal. Preferably, ring detector 450 is separately connected to the modem (described above). It should be noted that the circuit elements shown interconnecting receive and transmit lines 132'–138' and tip and ring lines 120 and 122 may be utilized in the embodiments of FIG. 3 as hybrid circuit 126.

The circuit element components interconnecting receive and transmit lines 132'–138' and cellular radio receive and transmit lines 127' and 129' are similar or identical to those illustrated in FIG. 8. More specifically, the circuit includes amplifiers 402, 404 and 406, resistors 408, 410, 412, 414, 416, 418, 420, 422, 424, 426 and 428, and capacitors 430, 432 and 434 and interconnected as shown.

In use, before an outgoing transmission is initiated, a user selects whether the transmission is to be sent out along the telephone line or through the cellular radio. The operator then controls switch 427 appropriately to select to the desired communication device. Then the operator initiates the telephone call in the manner as described above. For incoming messages the system determines whether the messages are received along the tip and ring lines or the cellular radio then controls switch 429 to automatically connect lines 132'–138' to tip and ring lines 120 and 122 or to cellular radio lines 127' and 129'. In one embodiment, the operator merely detects the incoming call from a ring generated either by the cellular radio or by ring detector 450 them manually controls switch 427 to connect the modem to the appropriate lines. Alternatively, switch 427 is controlled automatically, following the detection of an incoming telephone call. In such embodiment, ring detector 450 is interconnected directly to the modem or the computer for automated detection of a ring signal. For an incoming cellular radio communication, a separate line may need to be connected between the cellular radio or the modem or computer. Alternatively, the system is configured to remain connected to the cellular radio as a default input device with switch 427 only being switched to receive signals from tip and ring lines 120 and 122 upon the connection of a ring via ring detector 450. In this manner, a separate detection line need not be provided between the cellular radio and the modem or computer for detecting an incoming cellular radio communication.

As can be appreciated, the specific manner by which incoming telephone or cellular radio messages are detected and the manner by which 427 is controlled may vary according to specific applications and implementation, and such details will not be provided herein.

Thus, FIGS. 2–9 illustrate different embodiments of a system for allowing a modem, telephone headset, and host computer to emulate a telephone such that a separate telephone is not required. In a first embodiment, which is illustrated in FIGS. 2–4c, the system is connected to a land-based telephone line connected to the PSTN. In a second embodiment, which is illustrated in FIGS. 5–9, the system is connected to a non-land line based communication device, such as a cellular radio. Although described with respect to certain exemplary embodiments, those embodiments are merely illustrative of the invention, and should not be taken as limiting the scope of the invention. Rather principles of the invention can be applied to numerous specific systems and embodiments. In particular, the non-land line based embodiments of the invention may be applied to communication devices or modulation/ demodulation means utilizing any form of non-land line based transmission media, including radio, infrared, ultraviolet and acoustic waves. As an example, the system may be utilized in connection with in office infrared based local area network devices. In its various embodiments, the system allows full telephone emulation using only the telephone headset, modem an host computer. The system thus provides a simple and cost effective technique for emulating a telephone whereby a separate telephone is not required.

FIGS. 10–13 illustrate an invention for canceling the echoing or howling effect which commonly occurs in telephones (both land-based and non-land line based) in general and speakerphones in particular. Some parts of the invention illustrated in FIGS. 10–13 are similar to their corresponding counterparts in FIGS. 2–9 and like elements are so indicated by primed reference numbers. Where such similarities exist, the structures/elements of the invention of FIGS. 10–13 that are similar and function in a similar fashion as those in FIGS. 2–9 will not be described in detail again.

Figure 10:
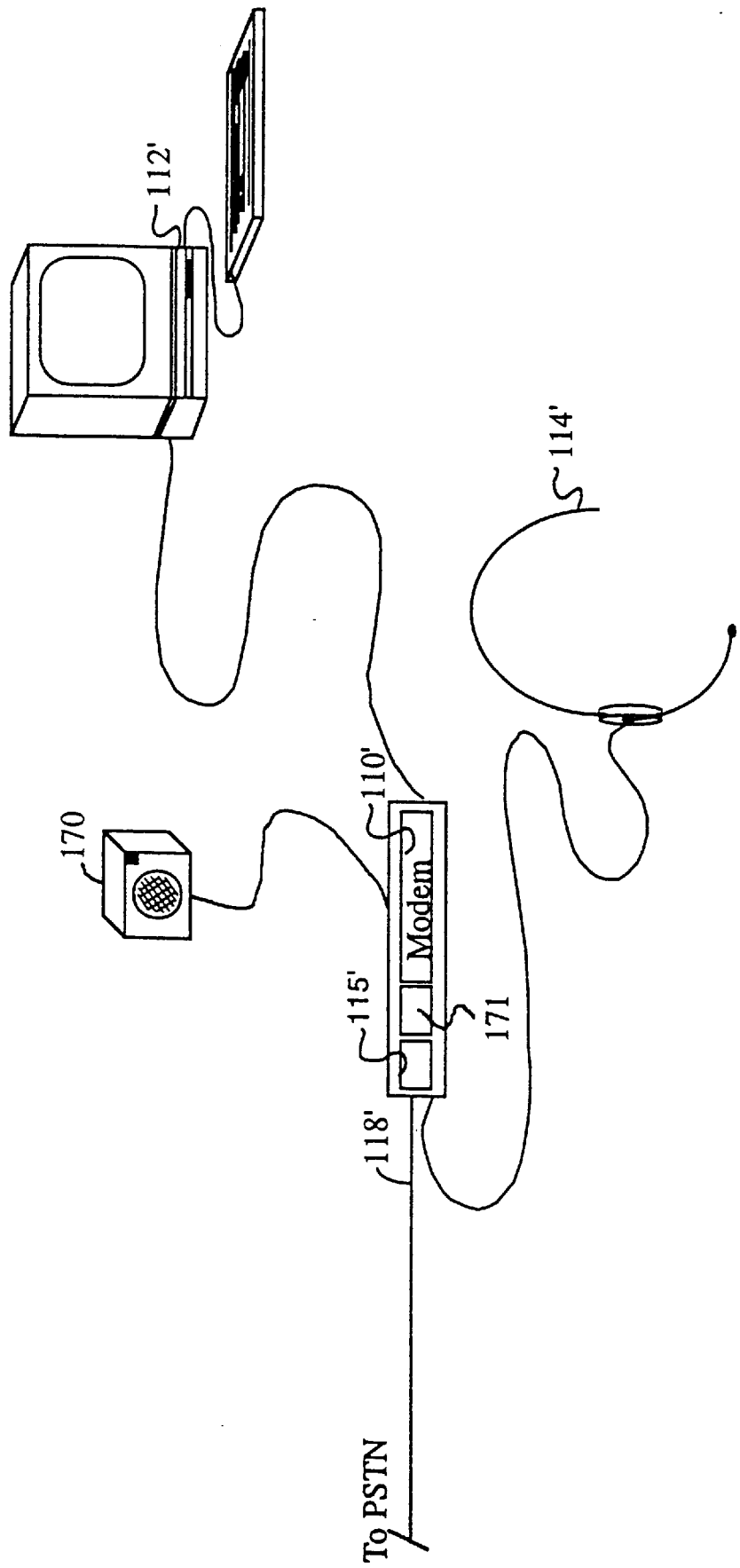
FIG. 10 is a block diagram illustrating an embodiment of the invention wherein a system is provided with a modem, a host computer, a telephone headset, a speakerphone, and an echo canceling circuit for enabling the speakerphone to operate with reduced echoing or howling while connected to a telephone land line.

Reference is now made to FIG. 10 which is a high level block diagram of a communication system having data/fax/voice modem 110', host computer 112', telephone headset 114', telephone emulator circuit 115', speakerphone 170, echo canceling circuit 171, and telephone line 118' connected to a PSTN. Echo canceling circuit 171 allows speakerphone 170 to operate without the undesirable echoes or howling noises typically associated with the operation of speakerphones. As discussed earlier, emulator circuit 171, in connection with a properly programmed host computer 112', provides a connection means which allows modem 110' and headset 114' to emulate the functions of the telephone, eliminating the need to provide a separate telephone, such as telephone 16 of FIG. 1. Emulator circuit 115' is included in FIG. 10 to illustrate its interoperability with echo canceling circuit 171 and should not be taken to imply any necessary physical configuration.

Figure 11:
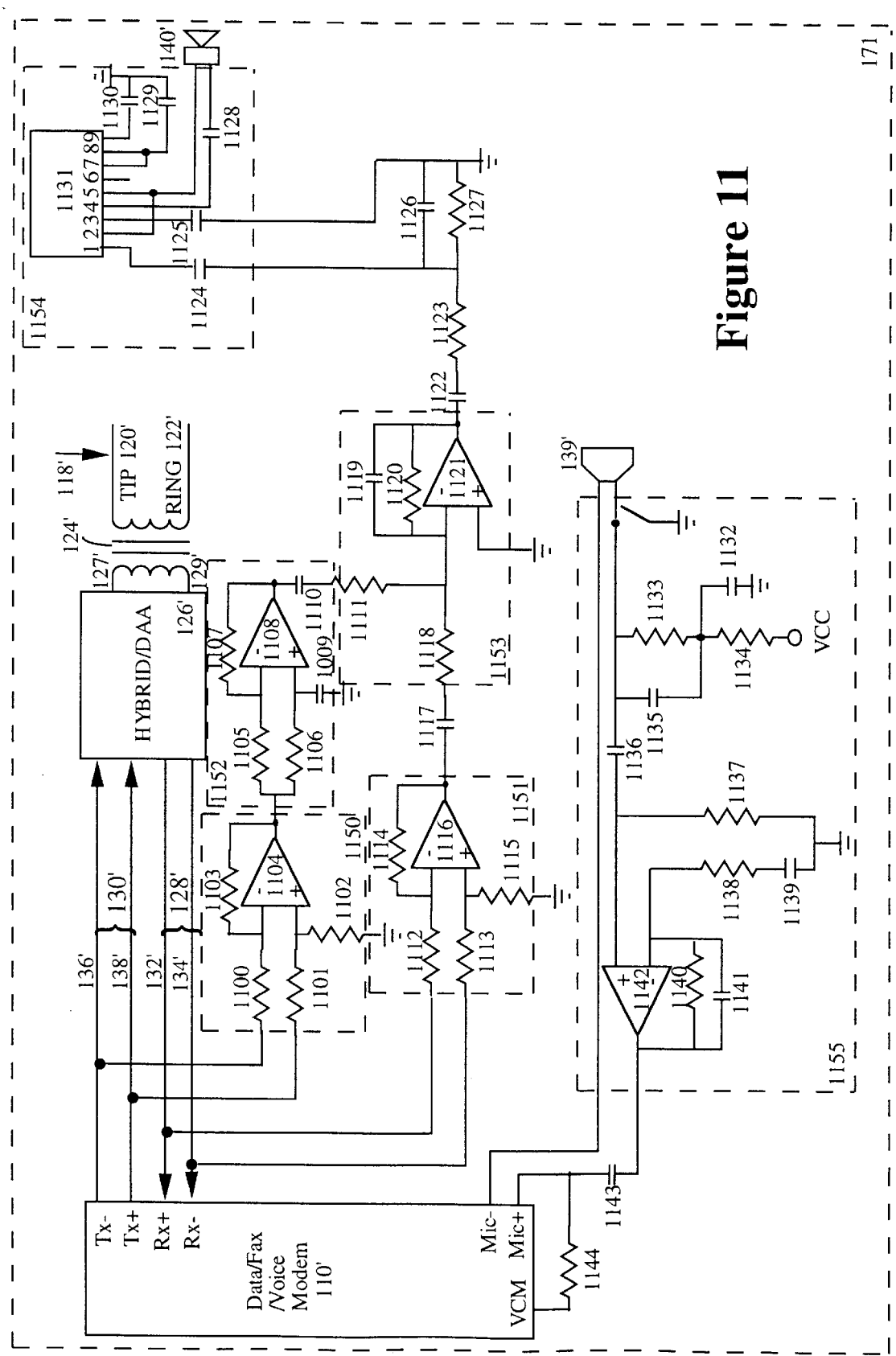
FIG. 11 is a schematic diagram of an embodiment of the echo canceling circuit which can be connected to a land-based telephone line.

FIG. 11 is a schematic diagram illustrating the preferred embodiment of echo canceling circuit 171 connected to a land-based telephone line linked to the PSTN. Telephone local loop wire pair 118' is composed of separate tip and ring lines, 120' and 122' respectively, which are connected through a transformer 124' to a hybrid circuit 126' through lines 127' and 129'. Transformer 124' couples signals between the PSTN and modem 110'. Hybrid/DAA circuit 126' physically separates transmit from receive signals with two wires for each direction. A detail description of hybrid/DAA circuit 126' is not presented here because its design and construction is well known in the art. A schematic of a typical hybrid circuit can be found, for example, in Bigelow, "Understanding Telephone Electronics", pages 70–71 (3d ed. 1994) which is herein incorporated by reference. Hybrid/DAA circuit 126' is connected to modem 110' via a receive line 128' and a transmit line 130'. Receive line 128' is composed of separate $R_x^+$ and $R_x^-$ lines, respectively denoted 132' and 134'. Transmit line 130' is composed of separate $T_x^+$ and $T_x^-$ lines, respectively denoted 136' and 138'. The four individual lines of the receive and transmit lines 128' and 130' are connected via hybrid circuit 126' to lines 127' and 129' which are connected to transformer 124' and vise versa.

Modem 110' is a data/fax/voice modem capable of placing telephone calls by taking line 118' off-hook and initiating a call using either pulse or DTMF dialing. For clarity, not all circuitry associated with modem 110' is illustrated in FIG. 11. Rather, refer to FIGS. 4a–4c for a detailed description of all the interconnection between modem ports Mic+, Mic−, $R_x^+$, $R_x^-$, $T_x^+$ and $T_x^-$. Although a variety of conventional modems may be employed, the invention is preferably used in connection with a CL-MD9624 or CL-MD1414 modem provided by Cirrus, Inc., the Assignee of rights to the present invention. The CL-MD9624 modem is provided with the aforementioned $R_x^+$, $R_x^-$, $T_x^+$ and $T_x^-$ ports, as well as a pair of microphone ports Mic+ or Mic− described below. For modems lacking such ports, some additional circuitry or other modifications may be required.

Due to problems associated with low signal-to-noise ratios associated with low level transducers such as microphones, both transmit and receive signals carried by transmit line 130' and receive line 128' respectively are handled as differential signals. Both transmit lines $T_x^+$ and $T_x^-$ are needed to carry the differential transmit signal which is the difference between the voltages on the two wires. Transmit lines $T_x^+$ and $T_x^-$ are provided as inputs to differential amplifier 1150 which outputs the product of the amplifier gain and the difference of amplifier 1150 two inputs. Differential amplifier 1150 includes resistors 1100–1103, and op-amp 1104. Transmit lines $T_x^-$ and $T_x^+$ are connected to one end of resistors 1100 and 1101 respectively. The other end of resistors 1100 and 1101 are connected to op-amp 1104 inverting input terminal (−) and non-inverting input terminal (+), respectively. Resistor 1102 is connected to non-inverting input terminal (+) and in parallel to resistor 1101. Resistor 1103 is connected between inverting input terminal (−) and the output terminal of op-amp 1104. The output terminal of op-amp 1104 is also the output terminal of differential amplifier 1150. Resistor 1100 and resistor 1103 are selected to provide the desired gain. Resistors 1101 and 1102 are mirror images of resistors 1100 and 1103 respectively.

The output signal of differential amplifier 1150 is provided as an input to phase shifting circuit 1152. As will be explained in more details below, the preferred embodiment of the present invention performs phase shifting in two different stages. First, the polarity between the differential transmit and receive voltage signals is reversed. Second, phase shifting circuit 1152 is used in finely adjusting the phase angle of the differential transmit voltage signals so that they are substantially 180 degree out of phase with the differential receive voltage signals. Phase shifting circuit 1152 includes resistors 1105–1107, capacitor 1109, and op-amp 1108. At one end, resistors 1105 and 1106 are connected to inverting (−) and non-inverting (+) input terminals of op-amp 1108 respectively. At the other end, resistors 1105 and 1106 are connected together to form the input terminal of phase shifting circuit 1152. The output terminal of op-amp 1108 is also the output terminal of phase shifting circuit 1152. Resistor 1107 is connected between inverting input terminal (−) and the output terminal of op-amp 1108. Capacitor 1109 is connected to resistor 1106 and non-inverting input terminal (+) of op-amp 1108 to form an RC circuit at non-inverting input terminal (+). The RC circuit at non-inverting input terminal (+) of op-amp 1108 is designed to create a phase lag in the transmit signal output by op-amp 1108. The amount of phase lag can be changed by varying the values of resistor 1106 and capacitor 1109. Resistors 1105 and 1107 are chosen to provide the desired gain for phase shifting circuit 1152.

Both receive lines $R_x^+$ and $R_x^-$ are needed to carry the differential receive signal which is the difference between the voltages on the two wires. Receive lines $R_x^+$ and $R_x^-$ are provided as inputs to differential amplifier 1151 which outputs the product of the amplifier gain and the difference of amplifier 1151 two inputs. Differential amplifier 1151 includes resistors 1112–1115, and op-amp 1116. Receive lines $R_x^+$ and $R_x^-$ are connected to one end of resistors 1112 and 1113 respectively. The other end of resistors 1112 and 1113 are connected to inverting input terminal (−) and non-inverting input terminal (+) of op-amp 1116, respectively. Resistor 1115 is connected to non-inverting input terminal (+) and in parallel to resistor 1113. Resistor 1114 is connected between inverting input terminal (−) and the output terminal of op-amp 1116. The output terminal of op-amp 1116 is also the output terminal of differential amplifier 1151. Resistor 1112 and resistor 1114 are selected to provide the desired gain. Resistors 1113 and 1115 are mirror images of resistors 1112 and 1114 respectively.

Since transmit lines $T_x^+$ and $T_x^-$ are coupled to non-inverting input terminal (+) and inverting input terminal (−) respectively while receive transmit lines $R_x^+$ and $R_x^-$ are coupled to inverting input terminal (−) and non-inverting input terminal (+) respectively, scaled output transmit signal from differential amplifier 1150 is nearly out of phase relative to scaled output receive signal from differential amplifier 1151. As such, phase shifting circuit 1152 can be used to fine adjust the two signals so that they are substantially 180 degrees out of phase relative to each other. It is clear to a person of ordinary skill in the art that the connection between transmit lines $T_x^+$ and $T_x^-$ together with the input terminals of operational amplifier 1150 and the connection between receive lines $R_x^+$ and $R_x^-$ and the input terminals of operational amplifier 1151 can be reversed to achieve essentially the same out of phase condition.

The output terminal of differential amplifier 1151 is connected to capacitor 1117 which is used to prevent low dc offset associated with phase shifting circuit 1152. Likewise, the output terminal of phase shifting circuit 1152 is connected to capacitor 1110 which is used to prevent low dc offset associated with the output of differential amplifier 1108.

Capacitors 1110 and 1117 are connected to the inputs of summing amplifier 1153. Summing amplifier 1153 adds its two amplified input signals together. Summing amplifier includes resistor 1111, resistor 1118, resistor 1120, capacitor 1119, and op-amp 1121. Resistors 1111 and 1118 are connected in parallel to inverting input terminal (−) of op-amp 1121. As such, resistors 1111 and 1118 are the input terminals for summing amplifier 1153. Non-inverting input terminal of op-amp 1121 is grounded. The output terminal of op-amp 1121 is also the output terminal for summing amplifier 1153. Resistor 1120 and capacitor 1119 are connected in parallel between inverting input terminal (−) and the output terminal of op-amp 1121. Resistors 1111, 1118, and 1120 are selected to provide the desired gains for the two input signals. Capacitor 1119 forms a low-pass filter. The output terminal of summing amplifier 1153 is connected to capacitor 1122 which is used to prevent high dc offset associated with summing amplifier 1153. Capacitor 1122 is connected at the other end to speaker driver 1154 which in turns is coupled to audio speaker 140'. Speaker driver 1154 is not described in details here because it is not claimed in the present invention and it is well known in the art that such a driver can be easily constructed using amplifier circuits such as the Phillips TDA1517 as shown as an example in FIG. 11. Additionally, speaker driver 1154 may provide high bandwidth limitation.

Microphone 139' coverts sound waves to differential audio signals and send them to microphone amplifier 1155 for amplification. A detailed description of microphone amplifier 1155 is not provided because it is not claimed in the present invention and it is well known that such an amplifier can easily be constructed using amplifier circuits such as the Toshiba TA2011 S as shown as an example in FIG. 11. Microphone amplifier is coupled to capacitor 1143 which serves to prevent dc offset associated with microphone amplifier circuit 1155. Capacitor 1143 is in turn connected in parallel with resistor 1144 to port Mic⁺ of modem 1060. Resistor 1144 is connected at its other end to a voltage source such as pin VCM of modem 1060. Additionally, microphone amplifier 1155 may provide low bandwidth limitation and AGC to the microphone signal.

As demonstrated above, the preferred embodiment of the present invention utilizes differential voltage transmit and receive signals. Since differential voltage transmit and receive signals are readily compatible to terminal ports $R_x^+$, $R_x^-$, $T_x^+$, and $T_x^-$, less hardware is required relative to the case in which differential current transmit and receive signals are used in implementing the echo canceling circuit.

A typical operational scenario of the echo canceling circuit is provided below as an example. When a telephone signal is received from tip and ring lines 120' and 122', it is sent to hybrid/DAA circuit 126'. Hybrid/DAA circuit 126' converts the telephone signal into a differential receive signal carried by $R_x^+$ and $R_x^-$ lines. The differential receive signal carried by $R_x^+$ and $R_x^-$ is coupled to the correspondingly named ports of modem 1160 and differential amplifier 1151. Differential amplifier 1151 amplifies the difference between the voltages on the two receive signal lines $R_x^+$ and $R_x^-$ and provides an amplified receive signal as its output. The amplified receive signal is supplied to capacitor 1117 which compensates for any dc offset that differential amplifier 1151 may have suffered. The amplified receive signal is then provided as input to summing amplifier 1153 which scales the amplified receive signal and adds to it any transmit signal received from phase shifting circuit 1152 which is none at this time. The amplified receive signal is compensated for any dc offset and then provided as input to speaker driver 1130 which in turns actuates audio speaker 140' to produce audio sounds.

Audio sounds from speaker 140' can feed back into microphone 139'. When this occurs, microphone converts the audio sound into a differential audio signal which are then amplified by microphone amplifier circuit 1155. An amplified differential audio signal is compensated for dc offset and supplied to ports Mic⁺ and Mic⁻ of modem 1160. Modem 1160 processes the differential audio signal and provides it as output at $T_x^+$ and $T_x^-$ ports as a microphone-transmit signal to be sent to differential amplifier 1150 and hybrid/DAA circuit 126'. Differential amplifier 1150 amplifies the difference of the voltages carried on lines $T_x^+$ and $T_x^-$ and sends the amplified microphone-transmit signal to phase shifting circuit 1152. Phase shifting circuit 1152 provides further phase shift of amplified microphone-transmit signal and sends the phase shifted amplified microphone transmit signal as input to summing amplifier 1153.

Hybrid/DAA circuit 126' converts a differential transmit signal carried by lines $T_x^+$ and $T_x^-$ of a four-wire-circuit to a telephone signal carried by tip and ring lines of a two-wire circuit. However, due to the inherent hybrid coupling in a typical hybrid/DAA circuit 126', part of differential transmit signal is fed through to receive lines $R_x^+$ and $R_x^-$. As a result, lines $R_x^+$ and $R_x^-$ now carry both a receive signal and a feed-through transmit signal This combination of receive signal and feed-through transmit signal is provided as input to summing amplifier 1153. Summing amplifier 1153 adds the combination signal to the microphone-transmit signal from phase shifting circuit 1152. As discussed earlier, the phase of the microphone-transmit signal is shifted by first reversing polarity between the transmit and receive signals and then fine tuning by phase shifting circuit 1152 to make it substantially 180 degrees out of phase with the feed-through transmit signal. As such the microphone-transmit signal and the feed-through transmit signal are substantially canceled leaving only the received signal to be passed to speaker 140'. As such, no acoustic signal picked up by microphone 139' is fed to speaker 140'. Only the receive signal is sent to speaker driver 1154 which actuates audio speaker 140' to generate audio sounds. Because the feedback signal is canceled, the loop gain can be controlled under one (1). The echoing or howling associated with system oscillations is prevented.

Figure 12:
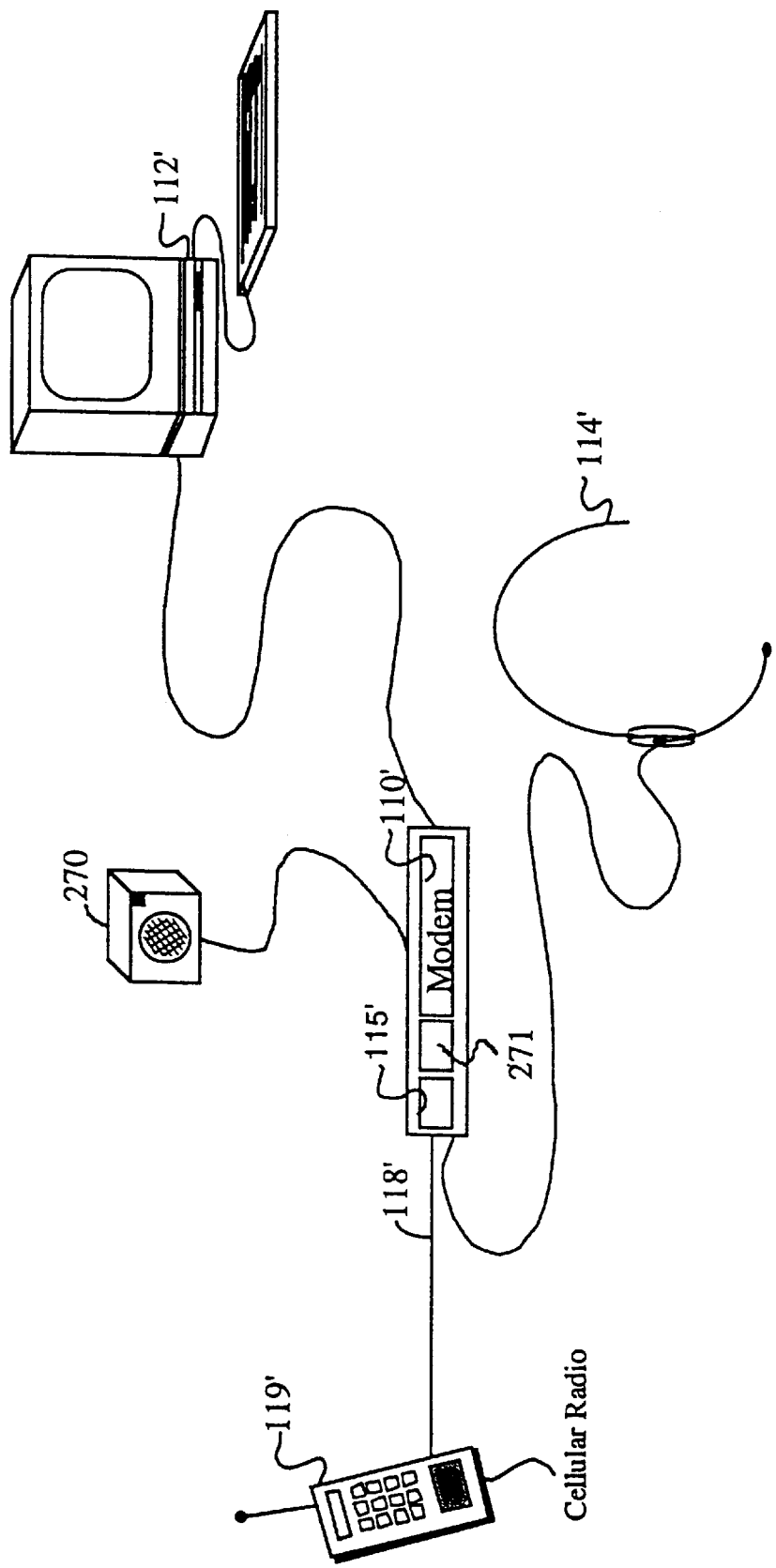
FIG. 12 is a block diagram illustrating an embodiment of the invention wherein a system is provided with a modem, a host computer, a telephone headset, a speakerphone, and an echo canceling circuit for enabling the speakerphone to operate with reduced echoing or howling while connected to a cellular radio.

Reference is now made to FIG. 12 which is a high level block diagram of a cellular radio having data/fax/voice modem 110', host computer 112', telephone headset 114', telephone emulator circuit 115', speakerphone 270, echo canceling circuit 271, and telephone line 118' connected to a cellular radio 119'. Echo canceling circuit 271 allows speakerphone 270 to operate without the undesirable echoes or howling noises typically associated with the operation of speakerphones. As shown, FIG. 12 is almost identical to FIG. 10.

Figure 13:
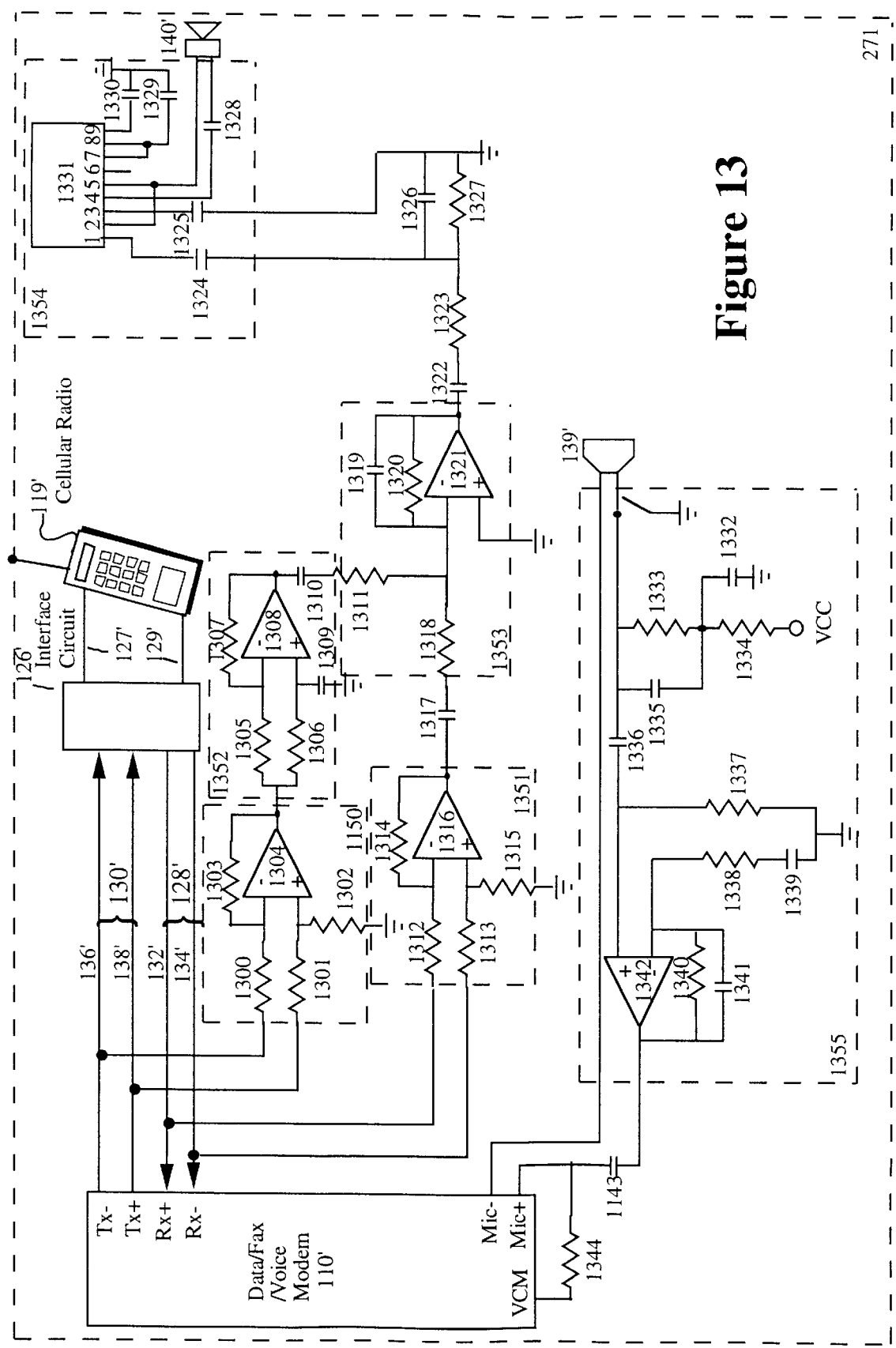
FIG. 13 is a schematic diagram of an embodiment of the echo canceling circuit which can be connected to a cellular radio.

The same echo canceling circuit described in FIG. 11 above can also be used with a non-land based communication device, such as a cellular radio as illustrated in FIG. 13. Echo canceling circuit 271 illustrated in FIG. 13 is exactly like echo canceling circuit 171 illustrated in FIG. 11. As a result, echo canceling circuit 271 shown in FIG. 13 have similar elements and operates similarly as echo canceling circuit 171 shown in FIG. 11. For brevity, a detailed description of echo canceling circuit 271 is not repeated here.

Although the various aspects of the present invention have been with respect to a preferred embodiment, it will be understood that the invention is entitled to full protection within the full scope of the appended claims.

What is claimed is:

1. A system oscillation canceling apparatus comprising:
    a modem having a receive line coupled to a communication device for receiving information from said communication device and a transmit line coupled to said communication device for transmitting information to said communication device, said receive and transmit lines each having a pair of signal wires of opposite polarity, said modem having receive, transmit, and microphone terminals of positive and negative polarity, said receive signal wires are coupled to said receive terminals, said transmit signal wires are coupled to said transmit terminals, said microphone terminals coupled to a microphone; and
    a cancellation circuit coupled to said modem and a speaker for canceling acoustical induced system oscillation; said cancellation circuit including:
    a first amplifier connected to said pair of transmit signal wires for detecting and scaling transmit signals from said pair of transmit signal wires, said first amplifier comprising:
        an operational amplifier having an inverting input terminal, a non-inverting input terminal, and an output terminal;
        a first resistor connected to said inverting input terminals;
        a second resistor connected between said inverting input terminal and said output terminal;
        a third resistor connected to said non-inverting input terminal; and
        a fourth resistor connected to said non-inverting input terminal and in parallel to said third resistor;
        wherein said transmit signal wires are connected to said first and third resistors; said first amplifier outputting scaled transmit signals;
    a phase shifting circuit receiving as input said scaled transmit signals for changing a phase of said transmit signals, said phase shifting circuit comprising:
        an operational amplifier having and inverting input terminal, a non-inverting input terminal, and an output terminal;
        a first resistor connected to said inverting input terminal;
        a second resistor connected between said inverting input terminal and said output terminal;
        a third resistor connected to said non-inverting input terminal; and
        a capacitor connected to said non-inverting input terminal and in parallel to said third resistor;
        wherein said first and third resistors connected together to form an input terminal of said phase shifting circuit, said phase shifting circuit outputting phase shifted transmit signals;
    a second amplifier connected to said pair of receive signal wires for detecting and scaling receive signals from said pair of receive signal wires, said second amplifier comprising:
        an operational amplifier having an inverting input terminal, a non-inverting input terminal, and an output terminal;
        a first resistor connected to said inverting input terminals;
        a second resistor connected between said first input terminal and said output terminal;
        a third resistor connected to said non-inverting input terminal; and a fourth resistor connected to said non-inverting input terminal and in parallel to said third resistor;
        wherein said transmit signal wires are connected to said first and third resistors; said first amplifier outputting scaled receive signals; and
    a summing amplifier receiving said phase shifted transmit signals and said scaled receive signals as inputs, said summing amplifier comprising:
        an operational amplifier having an inverting input terminal, a non-inverting input terminal, and an output terminal; wherein said non-inverting input terminal of said summing amplifier is connected to ground;
        a first resistor connected to said inverting input terminal thereby forming a first input terminal of said summing amplifier;
        a second resistor connected to said inverting input terminal in parallel with said first resistor thereby forming a second input terminal of said summing amplifier;
        a third resistor connected between said inverting input terminal and said output terminal: and
        a capacitor connected between said inverting input terminal and said output terminal and in parallel to said third capacitor;
    said summing amplifier outputting signals which are a sum of scaled signals of said phase shifted transmit signals and scaled signals of said scaled receive signals; said output signals are sent to said speaker.

2. The apparatus of claim 1, wherein said transmit signals and receive signals carried by said transmit signal wires and said receive signal wires respectively are voltage signals.

3. The apparatus of claim 1, wherein said receive and transmit signal wires connected to said receive and transmit terminals respectively such that said polarity of said receive and transmit signal wires match with said polarity of said receive and transmit terminals.

4. The apparatus of claim 3, wherein said transmit signal wires are polar correctly coupled to said inverting and non-inverting input terminals of said first amplifier and wherein said receive signal wires are polar reversely coupled to said inverting and non-inverting input terminals.

5. The apparatus of claim 3, wherein said transmit signal wires are polar reversely coupled to said inverting and non-inverting input terminals of said first amplifier and wherein said receive signal wires are polar correctly coupled to said inverting and non-inverting input terminals.

6. The apparatus of claim 1, wherein said modem is a data/fax/voice modem.

7. The apparatus of claim 1, wherein said communication device is a telephone connected to the public switched telephone network.

8. The apparatus of claim 3, wherein said communication device is a cellular radio and wherein said apparatus further comprising:
an interface circuit having:
a first amplifier for connecting said transmit line to said cellular radio and for converting said pair of transmit signal wires to a single line for output to said cellular radio; and
a second and third amplifiers for connecting said cellular radio to said receive line and for converting a single line input received from said cellular radio to said pair of receive signal wires for said receive line.

9. The apparatus of claim 8, wherein said transmit signals and receive signals carried by said transmit signal wires and said receive signal wires respectively are voltage signals.

10. The apparatus of claim 9, wherein said transmit signal wires are polar correctly coupled to said inverting and non-inverting input terminals of said first amplifier and wherein said receive signal wires are polar reversely coupled to said inverting and non-inverting input terminals of said second amplifier.

11. The apparatus of claim 9, wherein said transmit signal wires are polar reversely coupled to said inverting and non-inverting input terminals of said first amplifier and wherein said receive signal wires are polar correctly coupled to said inverting and non-inverting input terminals of said second amplifier.

12. The apparatus of claim 8, wherein said modem is a data/fax/voice modem.

13. The apparatus of claim 8, wherein said first amplifier of said interface circuit comprising:
an operational amplifier having an inverting input terminal, a non-inverting input terminal, and an output terminal;
a first resistor connected to said inverting input terminal thereby forming a first input terminal of said first amplifier of said interface circuit;
a second resistor connected to said inverting input terminal in parallel with said first resistor thereby forming a second input terminal of said first amplifier of said interface circuit;
a third resistor connected between said inverting input terminal and said output terminal; and
a fourth resistor connected to said non-inverting input terminal and in parallel to said second resistor; said fourth resistor connected to a voltage;
wherein said transmit signal wires are polar correctly connected to said first and second input terminals of said first amplifier of said interface circuit; wherein said output terminal of said first amplifier of said interface circuit is coupled to said cellular radio.

14. The apparatus of claim 13, wherein said output terminal of said first amplifier of said interface circuit is connected to a capacitor prior to being connected to said cellular radio.

15. The apparatus of claim 8, wherein said second amplifier of said interface circuit comprising:
an operational amplifier having an inverting input terminal, a non-inverting input terminal, and an output terminal;
a first resistor connected to said inverting input terminal thereby forming an input terminal of said second amplifier of said interface circuit;
a third resistor connected between said inverting input terminal and said output terminal; and
wherein said input signal line from said cellular phone is coupled to said input terminal of said second amplifier of said interface circuit; wherein a voltage is provided to said non-inverting input terminal of said operational amplifier.

16. The apparatus of claim 15, wherein said output terminal of said first amplifier of said interface circuit is connected to a capacitor prior to being connected to said cellular radio.

17. The apparatus of claim 15, wherein said third amplifier of said interface circuit comprising:
an operational amplifier having an inverting input terminal, a non-inverting input terminal, and an output terminal;
a first resistor connected to said inverting input terminal thereby forming an input terminal of said second amplifier of said interface circuit;
a third resistor connected between said inverting input terminal and said output terminal; and
wherein said output terminal from said second plifier of said interface circuit is connected to said input terminal of said third amplifier of said interface circuit; wherein a voltage is provided to said non-inverting input terminal of said operational amplifier; wherein said output terminals of said second and third amplifier of said interface circuit are coupled to said pair of receive signal wires.

18. The apparatus of claim 17 further comprising:
a coupling circuit having:
a first resistor connected at a first end to said output terminal of said second amplifier of said interface circuit;
a second resistor connected at a first end to said output terminal of said third amplifier of said interface circuit;
a capacitor connected between said second ends of said second and third amplifiers of said interface circuit; and
a third resistor connected between said second ends of said second and third amplifiers of said interface circuit and in parallel to said capacitor;
wherein said second ends of said first and second resistors are connected to said pair of receive signal wires.

19. A computer system coupled to a communication device comprising:
a host processor;
an input/output interface coupled to said host processor;
a modem connected to said input/output interface; said modem having a receive line coupled to said communication device for receiving information from said communication device and a transmit line coupled to said communication device for transmitting information to said communication device, said receive and transmit lines each having a pair of signal wires of opposite polarity, said modem having receive, transmit, and microphone terminals of positive and negative polarity, said receive signal wires are coupled to said receive terminals, said transmit signal wires are coupled to said transmit terminals, said microphone terminals coupled to a microphone; and cancellation circuit coupled to said modem and a speaker for canceling acoustical induced system oscillation, said cancellation circuit including:
a first amplifier connected to said pair of transmit signal wires for detecting and scaling transmit signals from said pair of transmit signal wires, said first amplifier comprising:
an operational amplifier having an inverting input terminal, a non-inverting input terminal, and an output terminal;
a first resistor connected to said inverting input terminals;
a second resistor connected between said inverting input terminal and said output terminal;
a third resistor connected to said non-inverting input terminal; and
a fourth resistor connected to said non-inverting input terminal and in parallel to said third resistor;
wherein said transmit signal wires are connected to said first and third resistors; said first amplifier outputting scaled transmit signals;
a phase shifting circuit receiving as input said scaled transmit signals for changing a phase of said transmit signals, said phase shifting circuit comprising:
an operational amplifier having and inverting input terminal, a non-inverting input terminal, and an output terminal;
a first resistor connected to said inverting input terminal;
a second resistor connected between said inverting input terminal and said output terminal;
a third resistor connected to said non-inverting input terminal; and
a capacitor connected to said non-inverting input terminal and in parallel to said third resistor;
wherein said first and third resistors connected together to form an input terminal of said phase shifting circuit, said phase shifting circuit outputting phase shifted transmit signals;
a second amplifier connected to said pair of receive signal wires for detecting and scaling receive signals from said pair of receive signal wires, said second amplifier comprising:
an operational amplifier having an inverting input terminal, a non-inverting input terminal, and an output terminal;
a first resistor connected to said inverting input terminals;
a second resistor connected between said first input terminal and said output terminal;
a third resistor connected to said non-inverting input terminal; and
a fourth resistor connected to said non-inverting input terminal and in parallel to said third resistor;
wherein said transmit signal wires are connected to said first and third resistors; said first amplifier outputting scaled receive signals; and
a summing amplifier receiving said phase shifted transmit signals and said scaled receive signals as inputs, said summing amplifier comprising:
an operational amplifier having an inverting input terminal, a non-inverting input terminal, and an output terminal; wherein said non-inverting input terminal of said summing amplifier is connected to ground;
a first resistor connected to said inverting input terminal thereby forming a first input terminal of said summing amplifier;
a second resistor connected to said inverting input terminal in parallel with said first resistor thereby forming a second input terminal of said summing amplifier;
a third resistor connected between said inverting input terminal and said output terminal; and
a capacitor connected between said inverting input terminal and said output terminal and in parallel to said third capacitor;
said summing amplifier outputting signals which are a sum of scaled signals of said phase shifted transmit signals and scaled signals of said scaled receive signals; said output signals are sent to said speaker.

20. The computer system of claim 19, wherein said communication device is a cellular radio; and wherein said computer system further comprising:
an interface circuit having:
a first amplifier for connecting said transmit line to said cellular radio and for converting said pair of transmit signal wires to a single line for output to said cellular radio; and
second and third amplifiers for connecting said cellular radio to said receive line and for converting a single line input received from said cellular radio to said pair of receive signal wires for said receive line.

21. A method for canceling system oscillations comprising: coupling an audio signal from a microphone to a modem;
reversing a polarity of said differential receive voltage signal relative to a polarity of said differential transmit voltage signal thereby causing said differential receive voltage signal to be out of phase with said differential transmit voltage signal;
amplifying a differential receive voltage signal from a communication device to produce an amplified differential receive voltage signal;
amplifying a differential transmit voltage signal from said modem to produce an amplified differential transmit voltage signal;
fine-adjusting said amplified differential transmit voltage signal to cause said amplified differential transmit voltage signal to be substantially 180 degrees out of phase with said amplified differential receive voltage signal;
adding said phase shifted amplified differential receive voltage signal to said amplified differential transmit voltage signal to produce an output signal; and
providing said output signal to a speaker.

* * * * *